United States Patent
Puente Pestaña et al.

(10) Patent No.: US 11,785,497 B2
(45) Date of Patent: Oct. 10, 2023

(54) FIRST NODE, SECOND NODE, THIRD NODE, AND METHODS PERFORMED THEREBY, FOR HANDLING DATA TRAFFIC

(71) Applicant: Telefonaktiebolaget LM Ericsson (publ), Stockholm (SE)

(72) Inventors: Miguel Angel Puente Pestaña, Madrid (ES); Alberto Del Campo, Becerril de la Sierra (ES); Javier Campo Trapero, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 248 days.

(21) Appl. No.: 17/274,380

(22) PCT Filed: Dec. 18, 2018

(86) PCT No.: PCT/EP2018/085582
§ 371 (c)(1),
(2) Date: Mar. 8, 2021

(87) PCT Pub. No.: WO2020/104047
PCT Pub. Date: May 28, 2020

(65) Prior Publication Data
US 2022/0272565 A1 Aug. 25, 2022

(30) Foreign Application Priority Data
Nov. 21, 2018 (EP) .................................... 18382838

(51) Int. Cl.
H04W 28/02 (2009.01)
H04L 47/2466 (2022.01)
H04L 41/16 (2022.01)
(52) U.S. Cl.
CPC ......... H04W 28/0268 (2013.01); H04L 41/16 (2013.01); H04L 47/2466 (2013.01)

(58) Field of Classification Search
CPC ..... H04L 12/1407; H04L 41/16; H04L 45/64; H04L 47/193; H04L 47/2466;
(Continued)

(56) References Cited

U.S. PATENT DOCUMENTS

| 2019/0239238 A1* | 8/2019 | Calabrese | H04W 24/08 |
| 2020/0053828 A1* | 2/2020 | Bharatia | H04W 76/11 |

(Continued)

OTHER PUBLICATIONS

International Search Report and Written Opinion dated Jun. 17, 2019 for International Application No. PCT/EP2018/085582 filed Dec. 18, 2018, consisting of 10—pages.
(Continued)

Primary Examiner — Awet Haile
(74) Attorney, Agent, or Firm — Christopher & Weisberg, P.A.

(57) ABSTRACT

A method performed by a first node is disclosed herein. The method is for handling data traffic. The first node operates in a communications network. The first node receives an indication from a second node operating in the network. The indication indicates, for a packet forwarding control protocol (PFCP) session, at least one of: i) a first rule for packet detection; and ii) a second rule of enforcement of quality of service. The first node initiates a process of optimization, based on reinforcement learning, of a procedure to control data traffic in the network. The process of optimization is further based on the received indication. A method performed by the second node is also described. The second node receives a first indication from the first node indicating that the first node supports the process of optimization. The second node then sends the indication to the first node.

15 Claims, 11 Drawing Sheets

(58) Field of Classification Search
CPC ...... H04M 15/00; H04M 15/12; H04M 15/66; H04W 28/0268; H04W 4/24; Y02A 40/25
See application file for complete search history.

(56) References Cited

U.S. PATENT DOCUMENTS

| | | | | |
|---|---|---|---|---|
| 2020/0128101 A1* | 4/2020 | Meng | ................... | G01C 21/36 |
| 2021/0337555 A1* | 10/2021 | Fan | ................... | H04W 28/24 |
| 2021/0360390 A1* | 11/2021 | Chun | ................... | H04W 48/06 |
| 2022/0021469 A1* | 1/2022 | Veijalainen | ........... | H04L 43/022 |

OTHER PUBLICATIONS

SA WG2 Meeting #129 Temporary Document S2-1810980 (revision of S2-1810965); Title: PCC and N4 handling of ATSSS; Agenda Item: 6.8; Source: Ericsson; Document for: Approval; Work Item/Release: FS_ATSSS/Rel-16; Date and Location: Oct. 15-19, 2018, Dongguan, P.R. China, consisting of 14—pages.

Wei Li et al.: QTCP: Adaptive Congestion Control with Reinforcement Learning; IEEE Transactions on Network Science and Engineering, vol. 6, No. 3, Jan. 1, 2018, consisting of 13—pages.

European Communication dated May 16, 2023 for Application No. 18 825 990.7, consisting of 8 pages.

Zhu et al., International Telecommunication Union SG13-TDxxx/WP1; Telecommunication Standardization Sector; Study Group 13; Title: Draft ne Recommendation ITU-T Y.qos-ml "Requirements of machine learning based on QoS assurance for IMT-2020"; Location and Date: Geneva, Jul. 16-27, 2018, consisting of 14 pages.

* cited by examiner a)

b)

a)

b)

a)

b)

FIRST NODE, SECOND NODE, THIRD NODE, AND METHODS PERFORMED THEREBY, FOR HANDLING DATA TRAFFIC

CROSS-REFERENCE TO RELATED APPLICATIONS

This application is a Submission Under 35 U.S.C. § 371 for U.S. National Stage Patent Application of International Application No.: PCT/EP2018/085582, filed Dec. 18, 2018 entitled "FIRST NODE, SECOND NODE, THIRD NODE, AND METHODS PERFORMED THEREBY, FOR HANDLING DATA TRAFFIC," which claims priority to European Application No.: 18382838.3, filed Nov. 21, 2018, the entireties of both of which are incorporated herein by reference.

TECHNICAL FIELD

The present disclosure relates generally to a first node and methods performed thereby for handling data traffic. The present disclosure also relates generally to a second node, and methods performed thereby for handling data traffic. The present disclosure further relates generally to a third node, and methods performed thereby for handling data traffic.

BACKGROUND

Computer systems may comprise one or more nodes. A node may comprise one or more processors which, together with computer program code may perform different functions and actions, a memory, a receiving and a sending port. A node may be, for example, a server. Nodes may be comprised in a communications network.

Some types of nodes within a communications network may be wireless devices, e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the telecommunications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The communications network may cover a geographical area which may be divided into cell areas, each cell area being served by another type of node, a network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies.

In 3rd Generation Partnership Project (3GPP) Long Term Evolution (LTE), base stations, which may be referred to as eNodeBs or even eNBs, may be directly connected to one or more core networks. All data transmission in LTE is controlled by the radio base station.

The standardization organization 3GPP is currently in the process of specifying a New Radio Interface called NR or 5G-UTRA, as well as a Fifth Generation (5G) Packet Core Network, which may be referred to as Next Generation Core Network, abbreviated as NG-CN, NGC, 5G CN or 5GC.

A 3GPP system comprising a 5G Access Network (AN), a 5G Core Network and a UE may be referred to as a 5G system. A new standard for the 5G System, Rel-15, has been just released, and is documented in [1] and [2].

Cups

In 5G, the Control Plane and User Plane separation (CUPS) between the Session Management Function (SMF) and the User Plane Function (UPF) may be understood to enable a flexible placement of the separated control plane and user plane functions for supporting diverse deployment scenarios, e.g., central or distributed user plane function.

FIG. 1 depicts a particular example of an architecture in 3GPP 5GC, which may be used as a reference for the present disclosure. In 5G, CUPS may be understood to refer to the SMF 1 and the UPF 2 network functions and to the N4 reference point 3 between them, which is based on Packet Forwarding Control Protocol (PFCP).

The SMF 1 may be understood to control the packet processing in the UPF 2 by establishing, modifying or deleting PFCP Session contexts, and by provisioning, e.g., adding, modifying or deleting, Packet Detection Rules (PDRs), Forwarding Action Rules (FARs), Quality of Service Enforcement Rules (QERs), Usage Reporting Rules (URRs) and/or Buffering Action Rule (BAR) per PFCP session context, whereby an PFCP session context may correspond to an individual Packet Data Unit (PDU) session or a standalone PFCP session not tied to any PDU session.

Each PDR may contain a Packet Detection Information (PDI), that is, one or more match fields against which incoming packets may be matched, and may be associated to the following rules providing the set of instructions to apply to packets matching the PDI.

A first rule may be one FAR, which may contain instructions related to the processing of the packets, specifically forward, duplicate, drop or buffer the packet with or without notifying the Control Plane (CP) function about the arrival of a Downlink (DL) packet.

A second rule may be zero, one or more QERs, which may contain instructions related to the Quality of Service (QoS) enforcement of the traffic.

A third rule may be zero, one or more URRs, which may contain instructions related to traffic measurement and reporting.

In CUPS, the UPF 2 may report to the SMF 1 the capabilities it supports. The current standardized capabilities are shown in Table 1, depicted below.

Also depicted in FIG. 1 are the Access and Mobility Management Function (AMF) 4, a User Data Repository (UDR) 5, a Network Exposure Function (NEF) 6, a Network Data Analytics Function (NWDAF) 7, an Application Function (AF) 8, a Policy Control Function (PCF) 9, and a (CHF)

10. Each of the SMF 1, the AMF 4, the UDR 5, the NEF 6, the NWDAF 7, the AF 8, the PCF 9, and the CHF 10 may have an interface through which they may be accessed, which as depicted in the Figure, may be, respectively: Nsmf 11, Namf 12, Nudr 13, Nnef 14, Nnwdaf 15, Naf 16, Npcf 17, and Nchf 18.

TABLE 1

| Feature Octet/Bit | Feature | Interface | Description |
| --- | --- | --- | --- |
| 5/1 | BUCP | Sxa | Downlink Data Buffering in CP function is supported by the UP function. |
| 5/2 | DDND | Sxa | The buffering parameter 'Downlink Data Notification Delay' is supported by the UP function. |
| 5/3 | DLBD | Sxa | The buffering parameter 'DL Buffering Duration' is supported by the UP function. |
| 5/4 | TRST | Sxb, Sxc | Traffic Steering is supported by the UP function. |
| 5/5 | FTUP | Sxa, Sxb | F-TEID allocation/release in the UP function is supported by the UP function. |
| 5/6 | PFDM | Sxb, Sxc | The PFD Management procedure is supported by the UP function. |
| 5/7 | HEEU | Sxb, Sxc | Header Enrichment of Uplink traffic is supported by the UP function. |
| 5/8 | TREU | Sxb, Sxc | Traffic Redirection Enforcement in the UP function is supported by the UP function. |
| 6/1 | EMPU | Sxa, Sxb | Sending of End Marker packets supported by the UP function. |
| 6/2 | PDIU | Sxa, Sxb, Sxc, N4 | Support of PDI optimised signalling in UP function (see subclause 5.2.1A.2). |

TCP Optimization

TCP may be understood as the protocol workhorse on the Internet. The Transmission Control Protocol (TCP) drives major internet operations such as video streaming, file transfers, web browsing, and communications, accounting for very high percentages of fixed access internet traffic and even more of mobile internet traffic. An important aspect of TCP is congestion control. A TCP congestion control algorithm (CCA) may be used to avoid congestion situations, and at the same time give as high throughput as possible.

Standard TCP may detect congestion from packet loss only. In a radio access network (RAN) with very low packet loss, this behavior may lead to excessive filling of buffers. The sender may have no knowledge of the actual user equipment (UE) receive rate, and may thus continue to increase its send rate. This may be understood to lead to wasted network resources and increased latency. Also, many applications may open up several TCP connections in parallel, each with an initial send rate. The applications may try to push hard to give each flow an advantage over other flows. This may cause the opposite effect of excessive congestion when large buffers are filled.

TCP optimization techniques may be understood to help to mitigate congestion by protecting the network from aggressive traffic. During low to medium cell load, it may in general be beneficial to push data fast. But when there are limitations in the radio network, aggressive TCP behavior may fill the buffers, provoke large loss rates and make TCP slow down considerably. TCP optimization solutions may contribute to enhance TCP performance, which may manifest as increased goodput, improved network efficiency, high TCP transfer speeds, lower retransmission rates, and more consistent TCP round-trip times.

Two main application types may be considered to be especially interesting for TCP optimization, web browsing and video. Web browsing may benefit from TCP optimization, as it may be understood to very latency sensitive. Also, web browsing may be considered the main application of most people's everyday Internet experience. Video is important as it is currently the most significant application in terms of volume.

TCP Optimizer

FIG. 2 is a schematic diagram depicting the basic architecture of a TCP optimizer 20. It may comprise the following modules: 1) A Transparent Buffer 21, whose main functionality may be understood to be to buffer the incoming packet 22, acknowledging the received packets back to the sender, and measure traffic Key Performance Indicators (KPIs), that may indicate congestion, e.g. throughput, latency/Round Trip Time (RTT), packet loss, etc., and 2) A Transmission Buffer 23, whose main functionality may be understood to be to forward packets buffered in the Transparent buffer at a certain transmission rate while also buffering them, in case they are lost and may need to be retransmitted again. It may also take from the Transparent buffer 21 the measurements 24 to adjust the transmission rate to the network conditions.

Reinforcement Learning

Reinforcement learning may be understood as a type of Machine Learning where a so-called "agent" may learn how to behave in an environment by performing actions and seeing the results. An agent may be understood as an entity that may interact with the environment and decide actions to be performed. FIG. 3 is a schematic diagram depicting how reinforcement learning may work. When performing an action 30, the agent 31 may receive a reward 32, which may indicate whether the environment 33 is in a desirable state 34 or not. Here, environment 33 may be understood as the element the agent may interacts with, that is, the network. A state 34 may be understood as a set of parameters that may describe the network status at a certain time. A reward 32 may be understood as a value that may indicate how desirable a certain state is. The logic of the agent may be required to maximize the overall reward of the state changes that may be caused by the decided actions. The agent 31 may execute algorithms that may learn to take actions 30 that may be understood to maximize some notion of cumulative reward 32 in the long term. An action 30 may be understood as a process to execute that may imply one or more changes in the traffic of the network.

In machine learning, the environment 33 may be typically modeled as a Markov decision process (MDP). MDP may be understood to use a finite set of states 34 and a finite set of actions 30 that may lead to state changes.

A reinforcement learning agen 31 may interact with its environment in discrete time steps. As depicted in FIG. 3, at each time step, the environment 33 is in some state (St) 34 and sends an observation of this state 34, along with the current reward (Rt) 32, to the agent 31. Then, the agent 31 may choose any action (At) 30 that is available in that state 34. Then, the environment 33 may respond at the next time step by moving into a new state (St+1) 34, and giving the agent 31 a corresponding reward (Rt+1) 32.

All the possible actions 30 the Agent 31 may take may be referred to as "action space", and all the possible states 34 of the environment 33 may be referred to as "observation space".

Iterating over this process and observing the rewards, the agent 31 may learn optimal policies that may map states 34 to actions 30 in such a way that the cumulative reward of the actions 30 may get maximized.

The agent 31 may switch between two modes and may find a balance between them: exploration, of uncharted territory, and exploitation, of current knowledge. In exploration, the agent 31 may take actions 30 that do not follow the optimal policies. For example, selecting actions randomly, using heuristic algorithms, or using more complex and optimized methods, such as epsilon-greedy. In exploitation, the agent 31 may take actions 30 according to the optimal policies that may have been learned during the exploration phase. The agent 31 may have full observability of the whole environmental state 34, or have partial observability of the environment state. This may be understood to mean that different agents acting over the same environment 33 may receive different state information from it.

Existing TCP optimization methods do not perform well when the conditions change unexpectedly, such as it may happen upon handovers, coverage losses, etc. Moreover, existing TCP optimization methods result in waste of processing, energy, and time-frequency resources, leading in turn to an underperformance of a network.

SUMMARY

It is an object of embodiments herein to improve the handling of data traffic in a communications network. It is a particular object of embodiments herein to improve the handling of data traffic in a 5G communications network.

According to a first aspect of embodiments herein, the object is achieved by a method performed by a first node. The method is for handling data traffic. The first node operates in the communications network. The first node receives an indication from a second node. The second node operates in the communications network. The indication indicates for a packet forwarding control protocol (PFCP) session, at least one of: i) a first rule for packet detection; and ii) a second rule of enforcement of quality of service. The first node also initiates a process of optimization, based on reinforcement learning, of a procedure to control data traffic in the communications network. The process of optimization is further based on the received indication.

According to a second aspect of embodiments herein, the object is achieved by a method, performed by the second node. The method is for handling data traffic. The second node operates in the communications network. The second node receives a first indication from a first node operating in the communications network. The first indication indicates that the first node supports the process of optimization of the procedure to control data traffic based on reinforcement learning. The second node also sends the indication to the first node. The indication requests an establishment of the PFCP session. The indication comprises at least one of: i) the first rule for packet detection; and ii) the second rule of enforcement of quality of service. The sending of the indication is based on the received first indication.

According to a third aspect of embodiments herein, the object is achieved by a method, performed by the third node. The method is for handling data traffic. The third node operates in the communications network. The third node receives the third indication from the second node. The second node operates in the communications network. The third indication indicates an identity of a subscriber of the communications network the PFCP session is being established for. The third node sends, based on the identity of the subscriber, a fourth indication to the second node. The fourth indication indicates a set of policy rules to be used during the session, in the process of optimization of the procedure to control data traffic for the subscriber in the communications network based on reinforcement learning.

According to a fourth aspect of embodiments herein, the object is achieved by the first node for handling data traffic. The first node is configured to operate in the communications network. The first node is further configured to receive the indication from the second node configured to operate in the communications network. The indication is configured to indicate, for the PFCP session, at least one of: i) the first rule for packet detection; and ii) the second rule of enforcement of quality of service. The first node is further configured to be initiate the process of optimization, based on reinforcement learning, of the procedure to control data traffic in the communications network. The process of optimization is further configured to be based on the indication configured to be received.

According to a fifth aspect of embodiments herein, the object is achieved by the second node for handling data traffic. The second node is configured to operate in the communications network. The second node is further configured to receive the first indication from the first node configured to operate in the communications network. The first indication is configured to indicate that the first node is configured to support the process of optimization of the procedure to control data traffic based on reinforcement learning. The first node is configured to send the indication to the first node. The indication is configured to request the establishment of the PFCP session. The indication is further configured to comprise at least one of: i) the first rule for packet detection; and ii) the second rule of enforcement of quality of service. To send the indication may be configured to be based on the first indication configured to be received.

According to a sixth aspect of embodiments herein, the object is achieved by the third node for handling data traffic. The third node is configured to operate in the communications network. The third node is further configured to receive the third indication from the second node configured to operate in the communications network. The third indication is configured to indicate the identity of the subscriber of the communications network the PFCP session is configured to be established for. The third node is configured to send, based on the identity of the subscriber, the fourth indication to the second node. The fourth indication is configured to indicate the set of policy rules to be used during the session, in the process of optimization of the procedure to control data traffic for the subscriber in the communications network based on reinforcement learning.

By the first node receiving the indication, and initiating the process of optimization, based on reinforcement learning, of the procedure to control data traffic based on the received indication, the first node is enabled to perform a dynamic optimization of the procedure to control data traffic, e.g., TCP, which may be understood to be able to learn and adapt to changing conditions in the communications network. The optimization may be performed without static algorithms or configurations.

By the second node providing the indication to the first node, which indication may be understood to originate from the third node, which may base it on the identity of the subscriber the PFCP session is established for, the second node may enable the first node to use parameters that may be needed to initiate the process of optimization, based on a per user and application basis. Obtaining recommendations from the third node may enable the first node to perform the process of optimization in a more efficient and dynamic manner.

BRIEF DESCRIPTION OF THE DRAWINGS

Examples of embodiments herein are described in more detail with reference to the accompanying drawings, according to the following description.

DETAILED DESCRIPTION

As part of the development of embodiments herein, a number of problems with the existing TCP optimization solutions exiting methods will first be identified and discussed.

The first problem of current TCP optimization methods is that they are based on static algorithms. That is, the algorithms to derive the transmission rate take certain measurements as input and derive the transmission rate in a static way. This makes the algorithms suitable for certain scenarios, but when the conditions change unexpectedly, such as it may happen upon handovers, coverage losses, etc., they do not perform well.

Second, a similar problem is that the current TCP optimization methods use static configurations, e.g., the sizes of the buffers, the transmission rate limits, etc. are configured in a static way. This makes the system rigid and non-optimal, since these parameters remain static while the network conditions may change. In the same way, different users or applications may need different buffer sizes according to their usual traffic volume, or other traffic characteristics.

Third, the only information that the UPF may get from the CP that may be used to optimize TCP optimization algorithms is the Maximum Bit Rate (MBR). However, other information may also be relevant for TCP optimization, such the desired "goodput", bit rate without retransmissions, maximum RTT deviation, etc. which is statically configured in the current TCP optimization methods.

Several embodiments are comprised herein, which address the limitations of the existing methods. Embodiments herein may be understood to aim at overcoming the problems mentioned above by using an approach based on Reinforcement Learning. As an overview, embodiments herein may be understood to be drawn to providing a novel method for TCP Optimization using Reinforcement Learning in 5G.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments.

Figure 4:
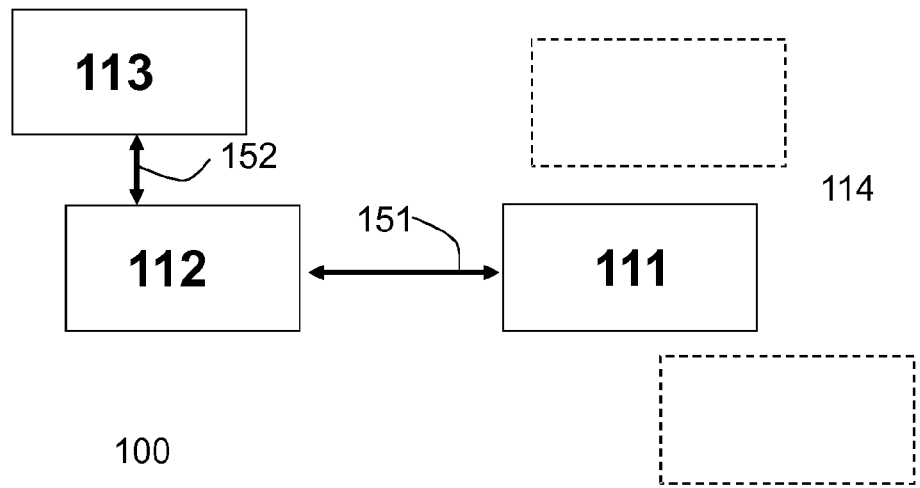
FIG. 4 is a schematic diagram illustrating two non-limiting examples in a) and b), respectively, of a communications network, according to embodiments herein.
Figure 4:
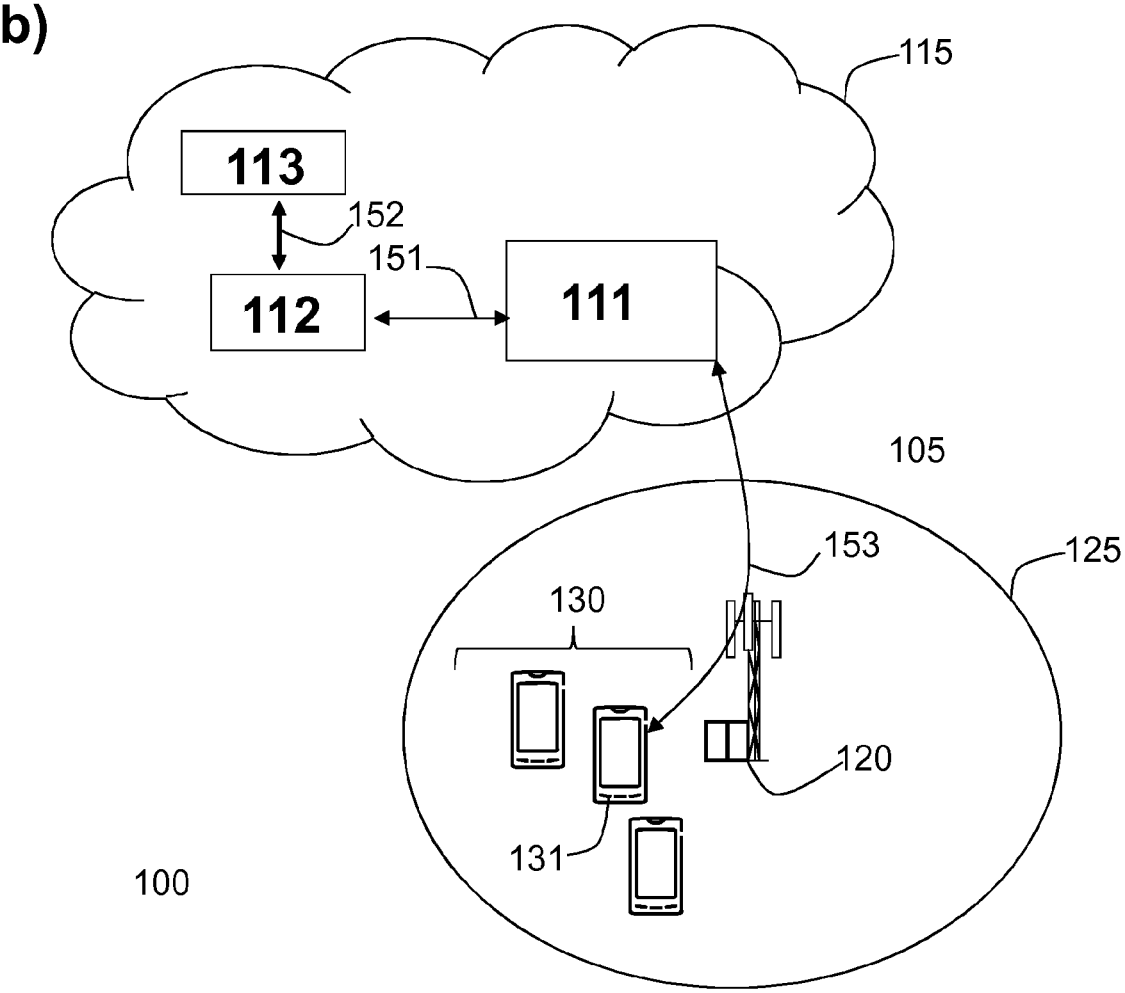

FIG. 4 depicts two non-limiting examples, in panels "a" and "b", respectively, of a communications network 100, in which embodiments herein may be implemented. In some example implementations, such as that depicted in the non-limiting example of FIG. 4a), the communications network 100 may be a computer network. The communications network 100 supports a 5G System, or a system with similar functionality. In other example implementations, such as that depicted in the non-limiting example of FIG. 4b), the communications network 100 may be implemented in a telecommunications network 105, sometimes also referred to as a cellular radio system, cellular network or wireless communications system. In some examples, the telecommunications network 105 may comprise network nodes which may serve receiving nodes, such as wireless devices, with serving beams.

In some examples, the telecommunications network 105 may for example be a network such as a 5G system, a 5G Core Network (5GC), or a Next Gen network. The telecommunications network 105 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system.

The communications network 100 comprises a plurality of nodes, whereof a first node 111, a second node 112, and a third node 113 are depicted in FIG. 4. The first node 111 may comprised in a plurality of first nodes 114. Each of the first node 111, the second node 112 and the third node 113 may be understood, respectively, as a first computer system, a second computer system and a third computer system.

The first node 111 may be understood as a node, e.g., a first core network node, having the capability to manage a UPF, or equivalent functionality. That is, a node capable of handling traffic passing through the communications network 100. The first node 111 may be understood to be able to support a process of optimization of a procedure to control data traffic based on Reinforcement Learning (RL). The procedure to control data traffic in the communications network 100 may be a Traffic Control Protocol (TCP). The first node 111 may comprise or manage a TCP optimizer module. The TCP optimizer module may in turn comprise a TCP sender module, a transparent buffer, a reinforcement learning agent, and a TCP Regulator module, or equivalent modules or functionalities, which may be named differently. The TCP sender module may be understood to have the capability to forward packets according to a certain bit rate. The transparent buffer may be understood to have a capability to handle a multidimensional observation space with a number of dimensions, which may comprise: throughput, Reception/Transmission (ReTx) ratio, RTT deviation, Acknowledged (ACKed) bit rate and TCP sender buffer usage, which will be described later, in relation to FIG. 5. The reinforcement learning agent may be collocated with the TCP Regulator module, which may have the capability to receive states and rewards from the transparent buffer, and may take decisions on the transmission rate, the buffer size, and bytes in flight limit of the TCP sender.

The second node 112 may be understood as a node, e.g., a second core network node, having the capability to manage an SMF, or equivalent functionality. That is, a node capable of managing packet sessions associated to the users of the communications network 100, e.g., the group of subscribers 130, such as mobile users such.

The third node 113 may be understood as a node, e.g., a third core network node, having the capability to manage a PCF, or equivalent functionality. That is, a node capable of controlling the communications network 100 by means of operator-defined policies.

In some examples, any of the first node 111, the second node 112 and the third node 113 may be implemented, as depicted in the non-limiting example of FIGS. 4a) and 4b), as a standalone server in e.g., a host computer in the cloud 115. Any of the first node 111, the second node 112 and the third node 113 may in some examples be a distributed node or distributed server, with some of their respective functions being implemented locally, e.g., by a client manager, and some of its functions implemented in the cloud 115, by e.g., a server manager. Yet in other examples, any of the first node 111, the second node 112 and the third node 113 may also be implemented as processing resources in a server farm. Any of the first node 111, the second node 112 and the third node 113 may be under the ownership or control of a service provider, or may be operated by the service provider or on behalf of the service provider.

Any of the first node 111, the second node 112 and the third node 113 may be enabled to communicate wirelessly in the communications network 100 and, in some particular examples, may be able support beamforming transmission. The communication may be performed e.g., via a RAN and possibly one or more core networks, comprised within the communications network 100.

The telecommunications network 105 may cover a geographical area, which in some embodiments may be divided into cell areas, wherein each cell area may be served by a radio network node 120, although, one radio network node may serve one or several cells. In the example of FIG. 4b, the radio network node 120 serves a cell 125. The radio network node 120 may be e.g., a gNodeB. That is, a transmission point such as a radio base station, for example an eNodeB, or a Home Node B, a Home eNode B or any other network node capable to serve a wireless device, such as a user equipment or a machine type node in the communications network 100. The radio network node 120 may be of different classes, such as, e.g., macro eNodeB, home eNodeB or pico base station, based on transmission power and thereby also cell size. In some examples, the radio network node may serve receiving nodes with serving beams. The radio network node 120 may support one or several communication technologies, and its name may depend on the technology and terminology used. Any of the radio network nodes that may be comprised in the communications network 100 may be directly connected to one or more core networks.

The communications network 100 comprises a group of subscribers 130 comprising a subscriber 131. The group of subscribers 130 is represented in FIG. 4 as a group of wireless devices. It may be understood that each subscribed in the group of subscribers 130 may use one or more wireless devices. In the non-limiting example scenario of FIG. 4 three subscribers in the group of subscribers 130 are represented as three wireless devices for illustrative purposes only. The number of subscribers, and the number of wireless devices that may be used by the subscribers may however vary. Any of the wireless devices used by the group of subscribers 130 may be also known as e.g., a UE, mobile terminal, wireless terminal and/or mobile station, mobile telephone, cellular telephone, or laptop with wireless capability, or a Customer Premises Equipment (CPE), just to mention some further examples. Any of the wireless devices used by the group of subscribers 130 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the communications network 100. Any of the wireless devices may be wireless, i.e., it may be enabled to communicate wirelessly in the communications network 100 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the communications network 100.

The first node 111 is configured to communicate within the communications network 100 with the second node 112 over a first link 151, e.g., a radio link, an infrared link, or a wired link. The first link 151 may be understood to be comprised of a plurality of individual links. The first node 111 is configured to communicate within the communications network 100 with the third node 113 over a second link 152, e.g., a radio link, an infrared link, or a wired link. The second link 152 may be understood to be comprised of a plurality of individual links. The radio network node 120 may communicate with the each of the wireless devices over a respective third link 153, e.g., a radio link. Each of the first link 151, the second link 152, and the third link 153 may be a direct link or a comprise one or more links, e.g., via one or more other network nodes, radio network nodes or core network nodes.

Any of the first link 151 and the second link 152 may be a direct link or it may go via one or more computer systems or one or more core networks in the communications network 100, which are not depicted in FIG. 4, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 4.

In general, the usage of "first", "second", "third" etc. herein may be understood to be an arbitrary way to denote different elements or entities, and may be understood to not confer a cumulative or chronological character to the nouns they modify.

Figure 1:
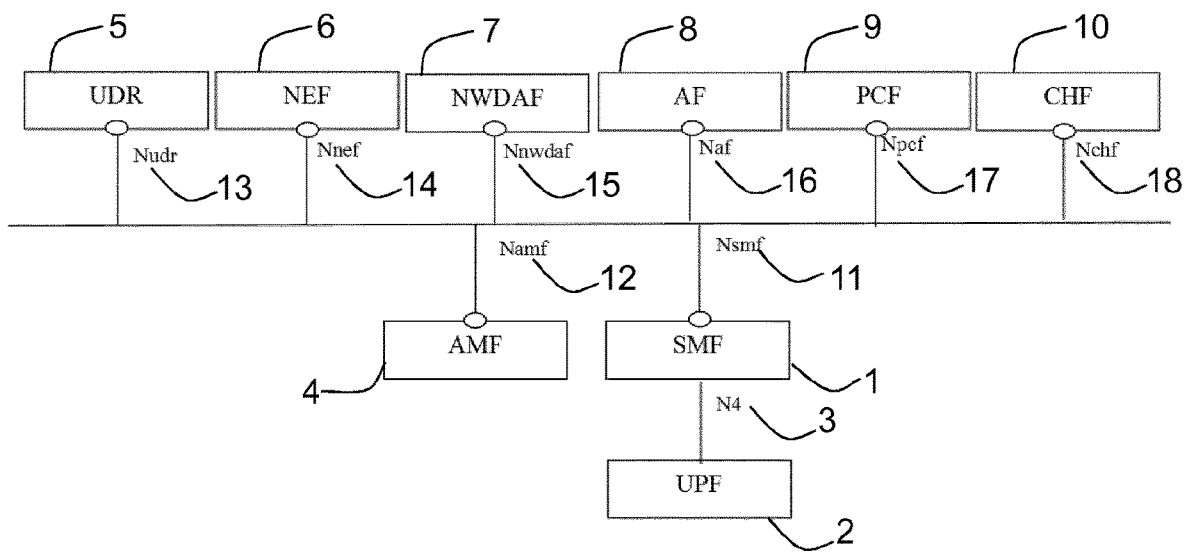
FIG. 1 is a schematic diagram illustrating a 5G architecture.
Figure 2:
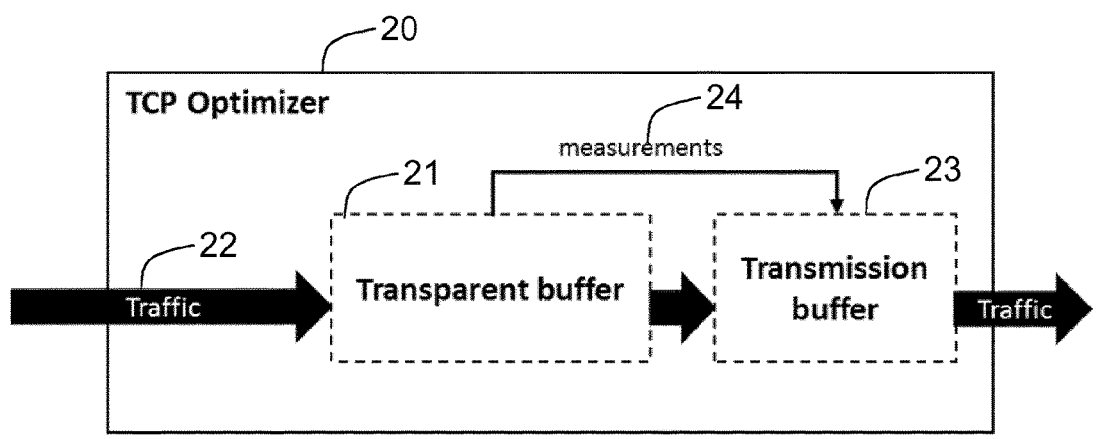
FIG. 2 is a schematic diagram illustrating a TCP optimizer.
Figure 3:
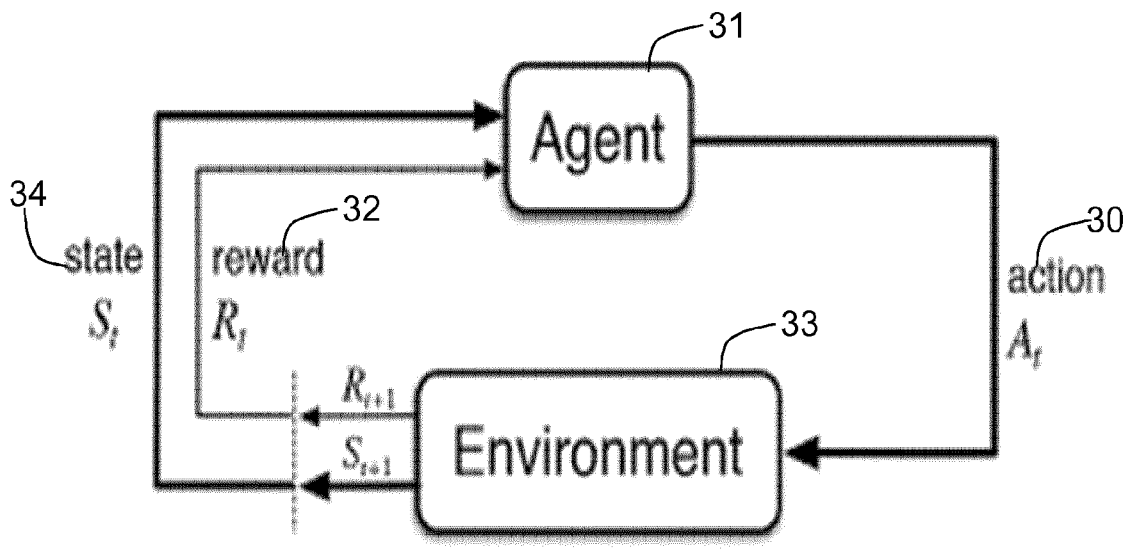
FIG. 3 is a schematic diagram illustrating machine learning.
Figure 5:
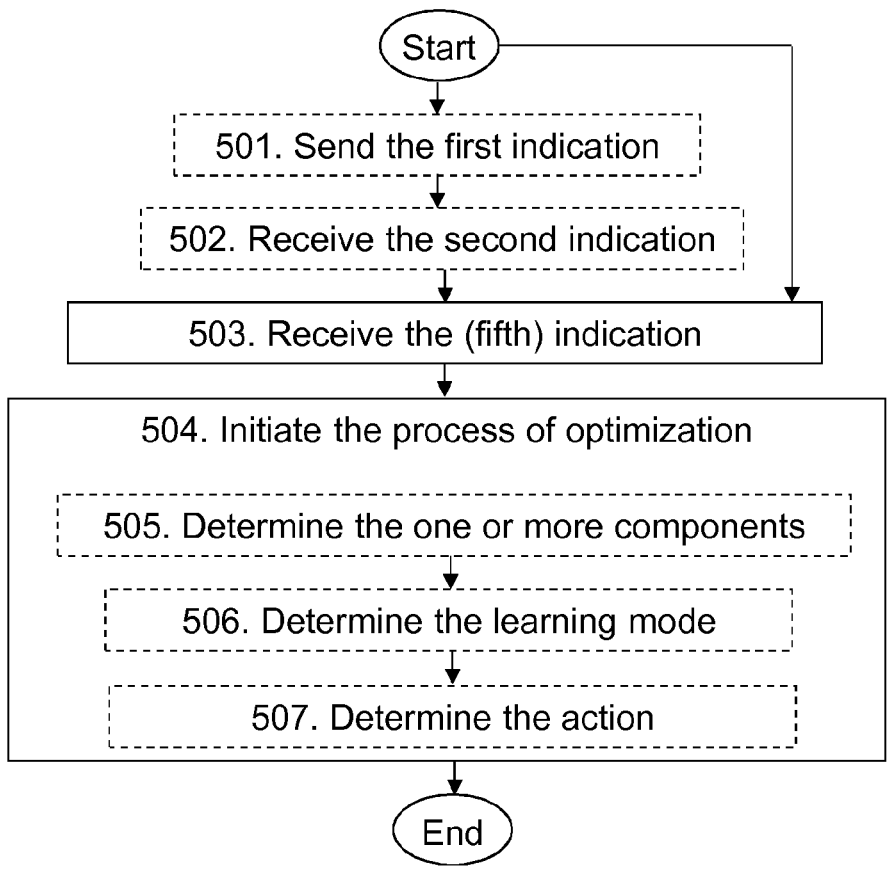
FIG. 5 is a flowchart depicting embodiments of a method in a first node, according to embodiments herein.

Embodiments of a method performed by the first node 111 will now be described with reference to the flowchart depicted in FIG. 5. The method may be understood to be for handling data traffic. The first node 111 operates in the communications network 100. In some embodiments, the communications network 100 may be a Fifth Generation (5G) network.

The method may comprise the actions described below. In some embodiments, some of the actions may be performed. In some embodiments, all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 5, an optional action is indicated with a dashed box.

Action 501

As stated earlier, the first node 111 may manage a user plane function (UPF). The first node 111 may be understood to be able to support a process of optimization of a procedure to control data traffic based on Reinforcement Learning (RL). The procedure to control data traffic in the communications network 100 may be a Traffic Control Protocol (TCP).

When the first node 111 may be deployed in the communications network 100, it may first need to associate to the second node 112, which may manage an SMF. To that extent, the first node 111 may send to the second node 112 a message, such as a PFCP association setup request message, which may comprise the UP function features the first node 111 may support. In this Action 501, the first node 111 may send a first indication to the second node 112 operating in the communications network 100. The first indication may indicate that the first node 111 supports the process of optimization of the procedure to control data traffic based on reinforcement learning. The sending in this Action 501 may be performed, e.g., via the first link 151.

According to some examples herein, the first indication may be comprised in the PFCP association setup request message mentioned earlier, and it may indicate a new feature: a support of Reinforcement Learning (RL) based TCP optimization.

By sending the first indication in this Action 501, the first node 111 enables the second node 112 to know the capability of the first node 111 to support the process of optimization of the procedure to control data traffic based on reinforcement learning.

Action 502

In this Action 502, the first node 111 may receive a second indication from the second node 112. The second indication may indicate that the second node 112 may support the process of optimization of the procedure to control data traffic based on reinforcement learning.

The second indication may be received, for example, in a message indicating Control Plane (CP) features the second node 112 may support, Such a message may be e.g., a PFCP association setup response message.

The receiving in this Action 502 may be performed, e.g., via the first link 151.

By receiving the second indication in this Action 502, the first node 111 may be enabled to know the capability of the second node 112 to support the process of optimization of the procedure to control data traffic based on reinforcement learning.

In some examples, the order of performance of Action 501 and Action 502 may be reversed.

Action 503

In the course of communications within the communications network 100, a user within the group of subscribers 130, via e.g., a wireless device, may establish a PDU session. The PDU session may be established, for example, when the user may want to establish a connection to an Application Server or a Data Network. A PDU session which may be understood as a connection between a UE and a Data Network, may be mapped to a PFCP session. A PFCP session may be understood as a connection between, e.g., a SMF node and UPF node, or nodes of equivalent functionality, on a per user basis to support the said PDU session.

The wireless device may, for example, send a PDU session establishment request message to another node in the communications network 110, e.g., a node managing an AMF, with the purpose of managing the connection of the wireless device to the access network. This node may relay the received PDU session establishment request message to the second node 112. The message may include an identity for the user, e.g., a User-ID. The second node 112 may query the third node 113 which may be capable of managing a Policy Control Function (PCF), in order to obtain policy rules for the PDU session, based on the identity of the user as a parameter. The third node 113 may respond to the query with the policy rules for that specific user. The policy rules may include an identifier for the application, e.g., an Application ID, a Maximum Bit Rate (MBR), a maximum ratio of reception and transmission (ReTx ratio), a maximum Round Trip Time (RTT) deviation, a maximum acknowledged (ACKed) bit rate, a maximum buffered volume, a maximum, average, and/or minimum transmission bit rate increase, a maximum, average, and/or minimum transmission bit rate decrease, a maximum, average, and/or minimum buffer size increase, and/or a maximum, average, and/or minimum buffer size decrease.

The MBR may be understood as the maximum bit rate to provide to a user, e.g., the subscriber 131.

The ReTx ratio may be understood as the ratio between retransmitted traffic and total traffic.

The maximum RTT may be understood as the maximum time that a packet may take to go from UE to the Application Server and come back to the UE.

The ACKed bit rate may be understood to offer an estimation of receiver buffer size and utilization and may be used in the process of optimization of the procedure to control data traffic, as a main contributor to calculate the maximum bytes in flight. Bytes in flight may be understood to refer to the bytes that may have been sent by the sender of the procedure to control data traffic, but have not been acknowledged yet by a UE.

The maximum buffered volume may be understood as the maximum traffic load that may be stored in the transmission buffer.

The bit rate increase may be understood as the specific value that the bit rate may be increased.

The bit rate decrease may be understood as the specific value that the bit rate may be decreased.

The buffer size increase may be understood as the specific value that the buffer size may be increased.

The buffer size decrease may be understood as the specific value that the buffer size may be decreased.

The second node 112 may have selected the first node 111, based on its knowledge that the first node 111 may be capable of supporting the RL-based TCP optimization feature.

The third node 113 may have provided, e.g., to the Policy and Charging Control (PCC), rules which may be understood to define operator-defined rules to apply to a certain user, e.g., the subscriber 131. The rules may, for example, comprise the MBR, the maximum ReTx ratio, the maximum RTT deviation, the maximum ACKed bit rate, the maximum buffered volume, the maximum, average, and/or minimum transmission bit rate increase, the maximum, average, and/or minimum transmission bit rate decrease, the maximum, average, and/or minimum buffer size increase, and the maximum, average, and/or minimum buffer size decrease.

In this Action 503, the first node 111 receives an indication from the second node 112 operating in the communications network 100. The indication, which may be referred to herein as a fifth indication, indicates, for a packet forwarding control protocol (PFCP) session, at least one of: i) a first rule for packet detection; and ii) a second rule of enforcement of quality of service.

The PFCP session may be understood to refer to a connection between the second node 112, an SMF node, and the first node 111, a UPF node, to support a PDU session for a certain user, e.g., the subscriber 131.

The receiving in this Action 503 may be performed, e.g., via the first link 151.

The fifth indication may be received e.g., in a message for the update of a session, e.g., a session establishment modification message.

Packet detection may be understood to refer to an identification of the application or traffic type a packet may belong to. The first rule for packet detection may indicate the packet matching rules for the specific application. The first rule may be understood to the set of protocol header values, e.g., IP address, that may allow to identify to what application a packet may belong to.

Enforcement of the quality of service may be understood to refer to force a certain quality, e.g., bit rate, to a traffic flow. The second rule may comprise the MBR, the maximum ReTx ratio, the maximum RTT deviation, the maximum ACKed bit rate, the maximum buffered volume, the maximum, average, and/or minimum transmission bit rate increase, the maximum, average, and/or minimum transmission bit rate decrease, the maximum, average, and/or minimum buffer size increase, and/or the maximum, average, and/or minimum buffer size decrease. The second rule may comprise the above parameters both for UL and DL.

By receiving the fifth indication, via the second node 112, the first node 111 may be understood to obtain information conveyed by the third node 113 indicating parameters that may be used to perform the process of optimization of the procedure to control data traffic based on reinforcement learning. For example, the parameters may be needed to calculate the reward for a certain state on a per user and application basis. These parameters may be: the MBR, the maximum ReTx ratio, the maximum RTT deviation, and the maximum ACKed bit rate. The fifth indication may additionally or alternatively, indicate, from the third node 113, via the second node 112, how to consider only a subset of the possible actions to choose from in a certain situation, so that the RL agent that may be comprised or managed by the first node 111, may be more efficient. These information may comprise the maximum, average, and/or minimum transmission bit rate increase, the maximum, average, and/or minimum transmission bit rate decrease, the maximum, average, and/or minimum buffer size increase, and/or the maximum, average, and/or minimum buffer size decrease. Any of the information comprised in the fifth indication may be indicated in absolute or relative terms.

According to further examples herein, the fifth indication may convey information from the third node 113, via the second node 112, indicating the maximum buffered volume, on a per user basis, and/or application basis, for example, upon PDU session establishment. The information conveyed in the fifth indication may have been obtained, both for UL and DL.

The first node 111 may have received the fifth indication from the second node 112, which may comprise the information received in the PCC rules, as part of an N4 session establishment procedure within Quality Enforcement Rules (QER), which may be linked to the Packet Detection Rules (PDR) associated to the specific application they may apply to.

At least one of the first rule and the second rule may be based on at least one of: i) an identity of a subscriber 131 of the communications network 100 the session is established for, ii) an identity of the session, iii) a type of service the session is established for; and iv) a policy rule for the group of subscribers 130 in the communications network 100.

The type of service may be understood as an application, e.g., a particular video sharing application, or a traffic type, e.g., video.

In some embodiments, according to the foregoing, the second rule may comprise one or more of: the maximum bit rate, the ratio of reception and transmission (ReTx), the maximum RTT deviation, the maximum ACKed bit rate, the maximum buffered volume, the maximum, average, and/or minimum transmission bit rate increase, the maximum, average, and/or minimum transmission bit rate decrease, the maximum, average, and/or minimum buffer size increase, and the maximum, average, and/or minimum buffer size decrease.

In some embodiments, the received (fifth) indication may further comprise a request to establish the PFCP session.

By receiving the fifth indication in this Action 503, the first node 111 is enabled to use the received fifth indication to perform the process of optimization of the procedure to control data traffic based on reinforcement learning, in a dynamic fashion, based on the information conveyed by the third node 113. For example, the first node 111 may have the TCP regulator, which may be comprised in or managed by the first node 111, decide an action to be performed in the process of optimization, based on the received maximum buffered volume, maximum, average, and/or minimum transmission bit rate increase, maximum, average, and/or minimum transmission bit rate decrease, maximum, average, and/or minimum buffer size increase, and maximum, average, and/or minimum buffer size decrease.

Action 504

In this Action 504, the first node 111 initiates the process of optimization, based on reinforcement learning, of the procedure to control data traffic in the communications network 100. The process of optimization is further based on the received indication, that is, the fifth indication.

To optimize the procedure to control data traffic may be understood to aim at carrying out a certain optimization process, e.g., maximize traffic throughput.

The Reinforcement Learning process may take place in a loop.

In some embodiments, the initiating of the process in Action 504 may comprise performing at least one of Action 505, Action 506 and Action 507.

Action 505

In this Action 505, the first node 111 may determine one or more components of the process of optimization, based on reinforcement learning, of the procedure to control data traffic in the communications network 100. The one or more components may be out of: i) a reward function, ii) one or more states, and iii) a set of actions to use in the optimization, out of a plurality of actions to perform the optimization. The initiating, in this Action 504, of the process, may further comprise proceeding with the process based on the determined one or more components.

For example, according to option ii), in some examples, the first node 111, e.g., via the transparent buffer, may measure traffic Key Performance indicators (KPIs) and derive a network state. When there is a state change, the transparent buffer may, according to option i), calculate a reward and send the state and the associated reward to the TCP regulator.

According to option ii), in some examples, the first node 111, e.g., via the transparent buffer, may calculate the reward based on the received MBR, the maximum ReTx ratio, the maximum RTT deviation, and the maximum ACKed bit rate.

According to option iii), in some examples, the first node 111, e.g., via the RL agent in the TCP regulator, may take action decisions based on the information received from the third node 113 via the second node 112, the state and reward received from the transparent buffer, the set of possible actions, that is, the action space, whether it is on exploration or exploitation mode, the learned policies, etc. Then, it may send the decided action set to the TCP sender.

The first node 111, e.g., via the RL agent, may configure an action space. This may be performed, for example, when the first node 111 may receive the second rule upon the PDU session establishment. Configuring the action space may comprise defining a bit rate action set. The first node 111, e.g., via the RL agent, may define a set of bit rate actions based on: the MBR, the maximum, average, and/or minimum transmission bit rate increase, and/or the maximum, average, and/or minimum transmission bit rate decrease. The specific algorithm may be implementation specific but, for example, the first node 111, e.g., via the RL agent, may derive a discrete uniformly distributed bit rate action space with MBR as the maximum bit rate of the space, and with the average transmission rate increase/decrease as the step between the bit rates within the space.

The first node 111, e.g., via the RL agent, may define a buffer size action set. The first node 111, e.g., via the RL agent may define a set of buffer size actions based on: current buffer sizes of the transparent buffer and TCP sender, a maximum buffered volume, a maximum, average, and/or minimum buffer size increase, and/or a maximum, average, and/or minimum buffer size decrease. The specific algorithm may be implementation specific but, for example, the first node 111, e.g., via the RL agent, may derive a discrete uniformly distributed buffer size action space with maximum buffered volume as the maximum buffer size of the space, and with the average buffer size increase/decrease as the step between the buffer sizes within the space.

The first node 111, e.g., via the RL agent, may define a bytes in flight action set. The first node 111, e.g., via the RL agent, may define the set of bytes in flight actions based on any of the above information but considering that the bytes in flight may be required to not exceed the maximum buffer size of the TCP sender. The specific algorithm may be implementation specific.

According to the foregoing, in some embodiments, the determining, in this Action 505, of the set of actions may further comprise determining one or more of: i) a first subset of actions of a bit rate, ii) a second subset of actions of a buffer size, and iii) a third subset of actions of bytes in flight.

Action 506

In this Action 506, the first node 111 may determine a learning mode out of an exploration mode and an exploitation mode.

The exploration mode may be understood as a process in which the first node 111, e.g., via the RL agent, may take exploratory actions to observe what effect they may cause in the environment.

The exploitation mode may be understood as the process in which the first node 111, e.g., via the RL agent, may take learned actions, that may be already known to be the best ones to take under a certain environment state.

Action 507

In this Action 507, the first node 111 may determine, from the determined set of actions in Action 505, an action to be performed. The determining, in this Action 507, of the action, may be based on the determined learning mode in Action 506.

According to some examples, the first node 111, e.g., via the TCP sender, may then apply the received actions in the process of optimization of the procedure to control data traffic based on reinforcement learning.

By initiating the process of optimization, based on reinforcement learning, of the procedure to control data traffic based on the fifth indication, the first node 111 is enabled to perform a dynamic optimization of the procedure to control data traffic, e.g., TCP, which may be understood to be able to learn and adapt to changing conditions in the communications network 100. The optimization may be performed without static algorithms or configurations. The configuration may be defined on a per user and application basis, using different optimization approaches according to the user and application needs.

By performing the process of optimization based on the fifth indication in particular, which may be understood to originate from the third node 113, and provide parameters that may be needed to calculate the reward, the first node 111 may be enabled to have independent reward functions on a per user and application basis.

Furthermore, as the action space that the first node 111, e.g., via the RL agent, may need to handle is large, obtaining recommendations from the third node 113 may enable the first node 111 to focus on a subset of actions, and may further allow it to perform the process of optimization in a more efficient manner.

Figure 6:
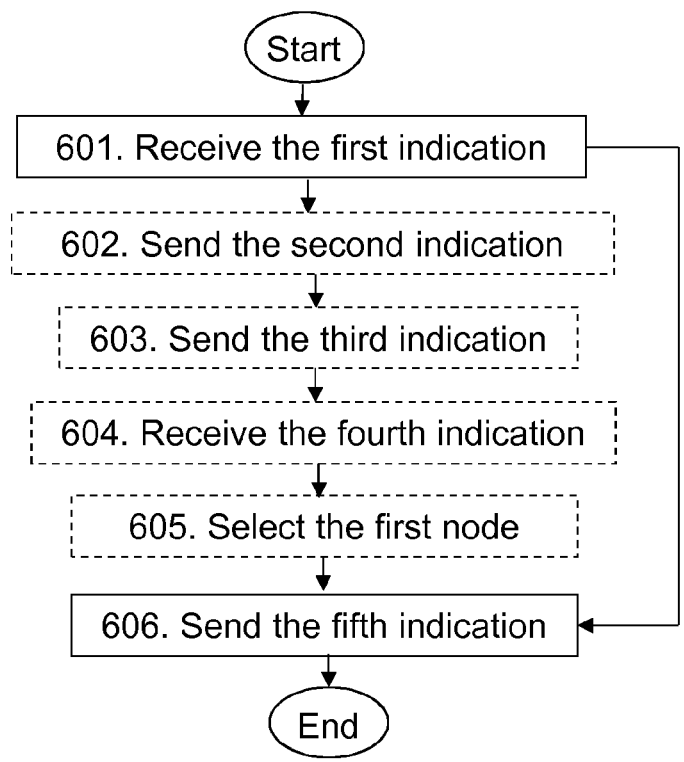
FIG. 6 is a flowchart depicting embodiments of a method in a second node, according to embodiments herein.

Embodiments of method performed by the second node 112 will now be described with reference to the flowchart depicted in FIG. 6. The method may be understood to be for handling data traffic. The second node 112 operates in the communications network 100.

The method may comprise the actions described below. In some embodiments, some of the actions may be performed. In some embodiments, all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 6, an optional action is indicated with a dashed box. The detailed description of some of the following corresponds to the same references provided above, in relation to the actions described for the first node 111, and will thus not be repeated here. For example, the first node 111 may manage a user plane function and the second node 112 may manage a session management function.

Action 601

In this Action 601, the second node 112 receives the first indication from the first node 111 operating in the communications network 100. The first indication may indicate that the first node 111 supports the process of optimization of the procedure to control data traffic based on reinforcement learning.

The receiving in this Action 601 may be performed, e.g., via the first link 151.

The procedure to control data traffic in the communications network 100 may be the TCP Action 602

In this Action 602, the second node 112 may send, in response to the received first indication, the second indication to the first node 111. The second indication may indicate that the second node 112 supports the process of optimization of the procedure to control data traffic based on reinforcement learning.

The sending in this Action 602 may be performed, e.g., via the first link 151.

Action 603

In this Action 603, the second node 112 may send a third indication to the third node 113 operating in the communications network 100. The third indication may indicate the identity of the subscriber 131 of the communications network 100 the session may be being established for.

The sending in this Action 602 may be performed, e.g., via the second link 152.

As described earlier, by performing this Action 603, the second node 112 may be able to query the third node 113 in order to obtain policy rules for the PDU session, based on the identity of the subscriber 131 as a parameter.

Action 604

In this Action 604, the second node 112 may receive, from the third node 113, a fourth indication. The fourth indication may indicate the set of policy rules to be used during the session, in the process of optimization of the procedure to control data traffic for the subscriber 131 in the communications network 100 based on reinforcement learning.

The receiving in this Action 604 may be performed, e.g., via the second link 152.

The fourth indication may comprise one or more of: an identifier of an application, the maximum bit rate, the ratio of ReTx, the maximum RTT deviation, the maximum ACKed bit rate, the maximum buffered volume, the maximum, average, and/or minimum transmission bit rate increase, the maximum, average, and/or minimum transmission bit rate decrease, the maximum, average, and/or minimum buffer size increase, and the maximum, average, and/or minimum buffer size decrease.

Action 605

In this Action 605, the second node 112 may select, out of the plurality of first nodes 114, the first node 111 to establish the session with. The selecting in this Action 605 may be based on the received fourth indication.

The second node 112 may have selected the first node 111, based on its knowledge that the first node 111 may be capable of supporting the RL-based TCP optimization feature.

Action 606

In this Action 606, the second node 112 sends the indication, that is a fifth indication, to the first node 111. The indication requests the establishment of the PFCP session. The (fifth) indication comprises at least one of: i). the first rule for packet detection, and ii) the second rule of enforcement of quality of service. The sending in this Action 606, of the (fifth) indication is based on the received first indication. That is, the fifth indication may be sent based on the capability of the first node 111 to support the process of optimization of the procedure to control data traffic based on reinforcement learning.

The receiving in this Action 602 may be performed, e.g., via the first link 151.

The fifth indication may be sent to the selected first node 111 in Action 605.

The second rule may comprise one or more of: the maximum bit rate, the ratio of ReTx, the maximum RTT deviation, the maximum ACKed bit rate, the maximum buffered volume, the maximum, average, and/or minimum transmission bit rate increase, maximum, average, and/or minimum transmission bit rate decrease, a maximum, average, and/or minimum buffer size increase, and a maximum, average, and/or minimum buffer size decrease.

Figure 7:
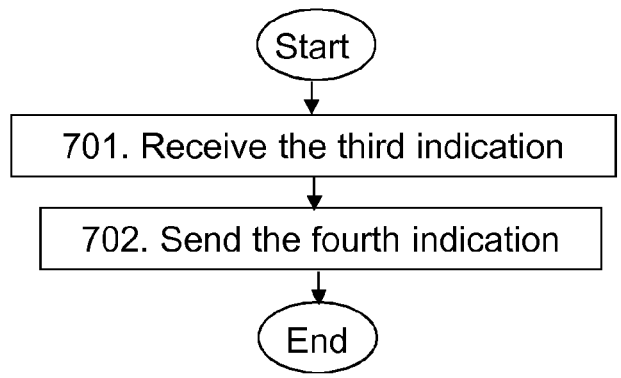
FIG. 7 is a flowchart depicting embodiments of a method in a third node, according to embodiments herein.

At least one of the first rule and the second rule may be based on at least one of: i) the identity of the subscriber 131 of the communications network 100 the session may be established for, ii) the identity of the session, iii) the type of service the session may be established for; and iv) the policy rule for the group of subscribers 130 in the communications Embodiments of method performed by the third node 113 will now be described with reference to the flowchart depicted in FIG. 7. The method may be understood to be for handling data traffic. The third node 113 operates in the communications network 100.

The method comprises the actions described below. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111, and will thus not be repeated here to simplify the description. For example, the procedure to control data traffic in the communications network 100 may be the TCP.

Action 701

In this Action 701, the third node 113 receives the third indication from the second node 112 operating in the communications network 100. The third indication indicates the identity of the subscriber 131 of the communications network 100 the PFCP session is being established for.

The receiving in this Action 701 may be performed, e.g., via the second link 152.

The third node 113 may manage the policy control function and the second node 112 may manage the session management function.

Action 702

In this Action 702, the third node 113 sends, based on the identity of the subscriber 131, the fourth indication to the second node 112. The fourth indication indicates the set of policy rules to be used during the session, in the process of optimization of the procedure to control data traffic for the subscriber 131 in the communications network 100 based on reinforcement learning.

The sending in this Action 702 may be performed, e.g., via the second link 152.

The third node 113 may respond to the query with the policy rules for that specific user. The policy rules may include an identifier for the application, e.g., an Application ID, a Maximum Bit Rate (MBR), a maximum ratio of reception and transmission (ReTx ratio), a maximum Round Trip Time (RTT) deviation, a maximum acknowledged (ACKed) bit rate, a maximum buffered volume, a maximum, average, and/or minimum transmission bit rate increase, a maximum, average, and/or minimum transmission bit rate decrease, a maximum, average, and/or minimum buffer size increase, and/or a maximum, average, and/or minimum buffer size decrease.

Accordingly, the fourth indication may comprise one or more of: the identifier of the application, the maximum bit rate, the ratio of ReTx, the maximum RTT deviation, the maximum ACKed bit rate, the maximum buffered volume, the maximum, average, and/or minimum transmission bit rate increase, the maximum, average, and/or minimum transmission bit rate decrease, the maximum, average, and/ or minimum buffer size increase, and the maximum, average, and/or minimum buffer size decrease.

The fourth indication may be further based on at least one of: i) the identity of the session, ii) the type of service the session may be established for; and iii) the policy rule for the group of subscribers 130 in the communications network 100.

Figure 8:
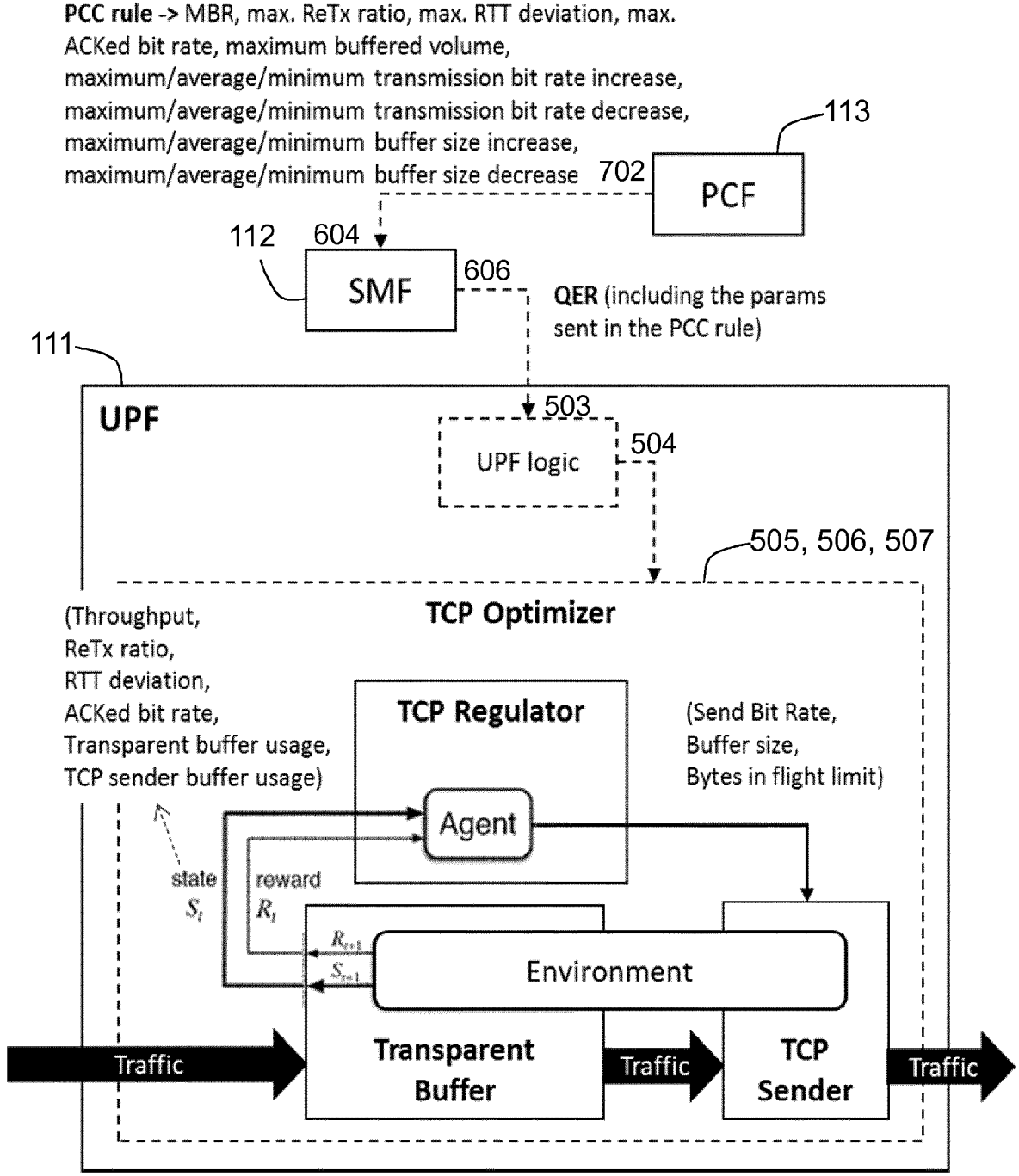
FIG. 8 is a flowchart depicting a non-limiting example of a method in a communications network, according to embodiments herein.

FIG. 8 is a schematic diagram depicting a non-limiting example of an architecture of the communications network 100, comprising the involved nodes, as well as their interfaces and the architecture within the first node 111 in relation to the Reinforcement Learning architecture. The reference numerals in FIG. 8 correspond to the nodes and Actions performed, as described above.

Figure 9:
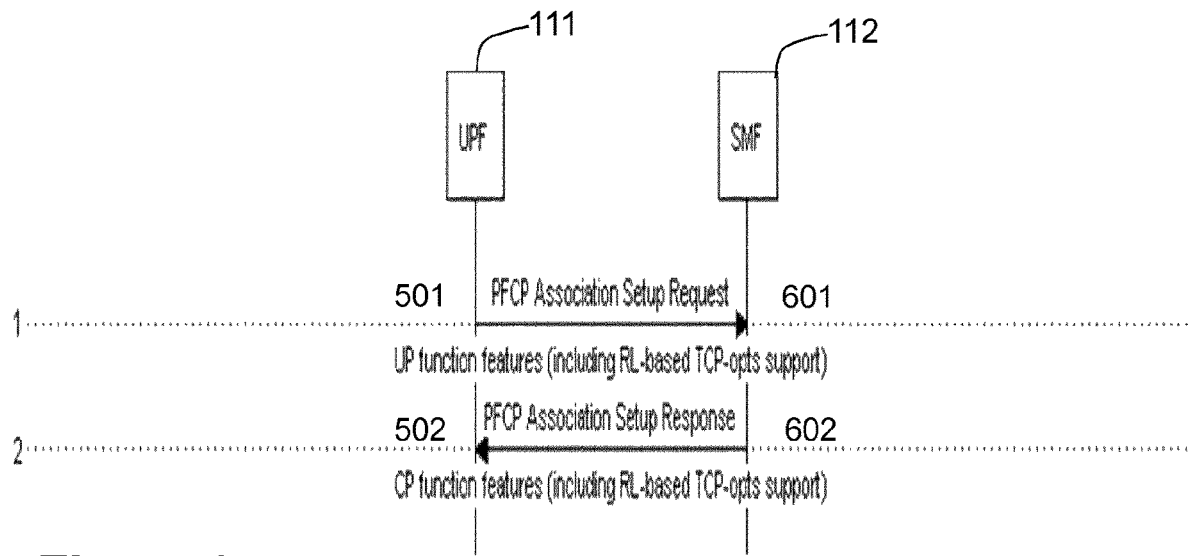
FIG. 9 is a flowchart depicting a non-limiting example of a method in a first node and a second node, according to embodiments herein.

FIG. 9 is a schematic diagram depicting a non-limiting example of an association procedure between the first node 111, here a UPF, and the second node 112, here an SMF. The reference numerals in FIG. 9 correspond to the nodes and Actions performed, as described above. When the UPF is deployed in the communications network 100, it may first need to associate to a SMF. To that extent, the UPF sends, according to Action 501, to the SMF, the PFCP Association Setup Request message comprising the UP function features it supports. It also comprises the first indication of a new feature according to embodiments herein: the support of the Reinforcement Learning based TCP optimization. In turn, the SMF, according to Action 602, replies to the association request with a PFCP Association Setup Response message comprising the CP function features it supports. It also comprises the indication of a new feature: the support of the Reinforcement Learning based TCP optimization. It may be noted that Step 1, as indicated in the Figure, may be triggered by the UPF or the SMF. In case it is triggered by the SMF, the SMF may send the association request message to the UPF comprising the CP features and may then receive the response comprising the UP features.

Figure 10:
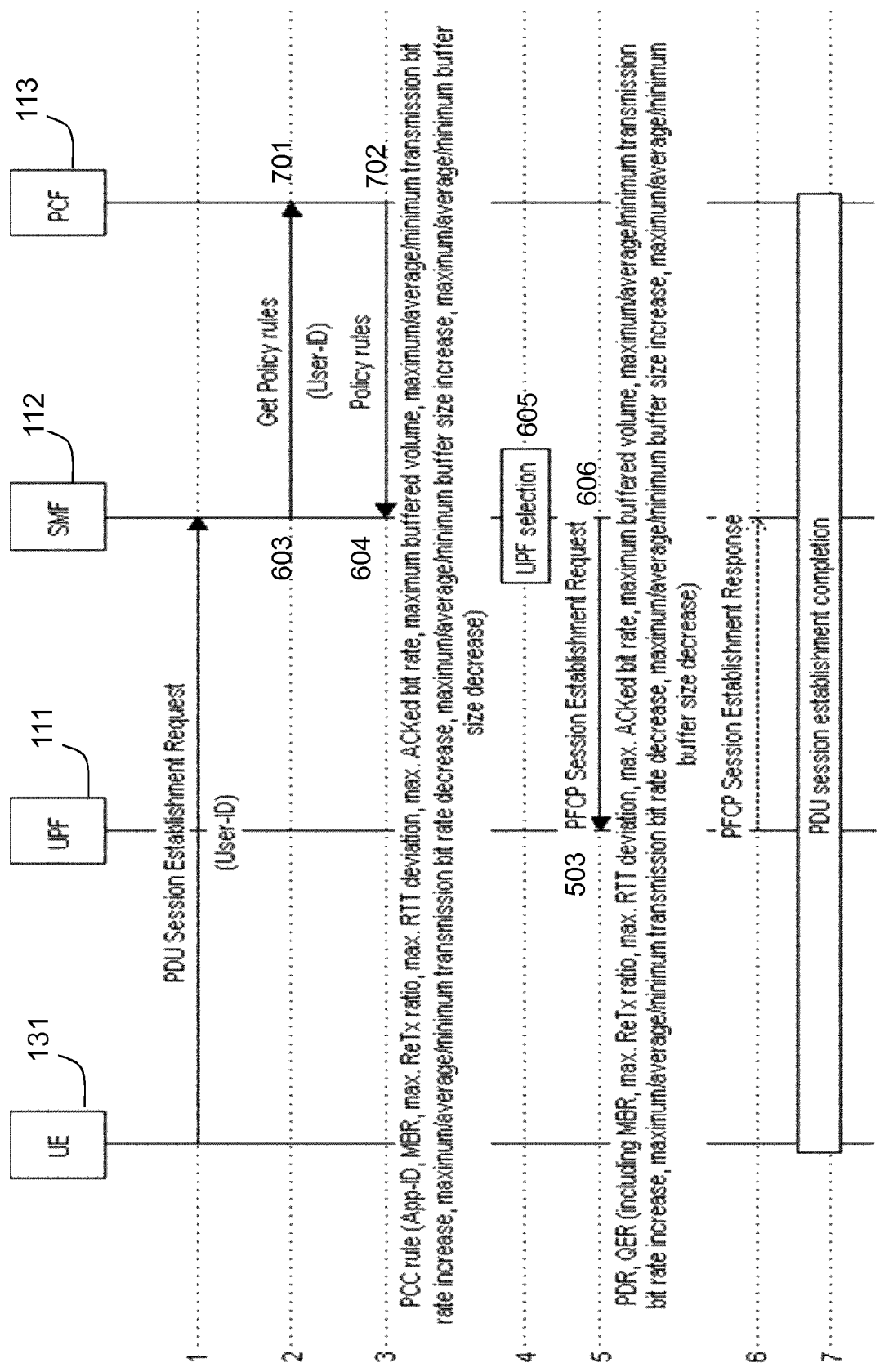
FIG. 10 is a flowchart depicting a non-limiting example of a method in a communications network, according to embodiments herein.

FIG. 10 is a schematic diagram depicting a non-limiting example of a PDU session establishment procedure, according to embodiments herein. The reference numerals in FIG. 10 correspond to the nodes and Actions performed, as described above. At 1, the UE of the subscriber 131 sends a PDU session establishment request message to an AMF, and the AMF relies it to the second node 112, here an SMF. The message includes the User-ID of the subscriber 131. At 2, the SMF queries the third node 113, here a PCF, according to Action 603, by sending the third indication including the User-ID as parameter, to get the policy rules. At 3, the PCF responds to the SMF sending the fourth indication, according to Action 702, with the policy rules for that specific subscriber 131. The policy rules comprise the Application ID, the MBR, the maximum ReTx ratio, the maximum RTT deviation, the maximum ACKed bit rate, the maximum buffered volume, the maximum, average, and/or minimum transmission bit rate increase, the maximum, average, and/or minimum transmission bit rate decrease, the maximum, average, and/or minimum buffer size increase, and/or the maximum, average, and/or minimum buffer size decrease. The bit rate increase and/or decrease and buffer size increase and/or decrease values may be defined in absolute terms, e.g., a specific value, or in relative terms, e.g., the relation with the current value. When according to Action 604, the SMF receives the above information in a PCC rule, it knows it relates to the RL-based TCP optimization feature in the UPF, so at 4, the SMF selects, according to Action 605, a UPF supporting this feature for the user, that is, the first node 111. At 5, the SMF sends, according to Action 606, to the UPF, the fifth indication, in the PFCP Session Establishment Request message, comprising: a) the first rule, e.g., a PDR, indicating the packet matching rules for the specific application, b) the second rule, e.g., a QER comprising the MBR, the maximum ReTx ratio, the maximum RTT deviation, the maximum ACKed bit rate, the maximum buffered volume, the maximum, average, and/or minimum transmission bit rate increase, the maximum, average, and/or minimum transmission bit rate decrease, the maximum, average, and/ or minimum buffer size increase, the maximum, average, and/or minimum buffer size decrease. The QER may comprise the above parameters both for UL and DL. The message for the update of the session, e.g., the Session Establishment-Modification may be equivalent to this step. At 6, the UPF sends a PFCP Session Establishment Response message back to the SMF. At 7, the PDU session establishment procedure is completed.

Figure 11:
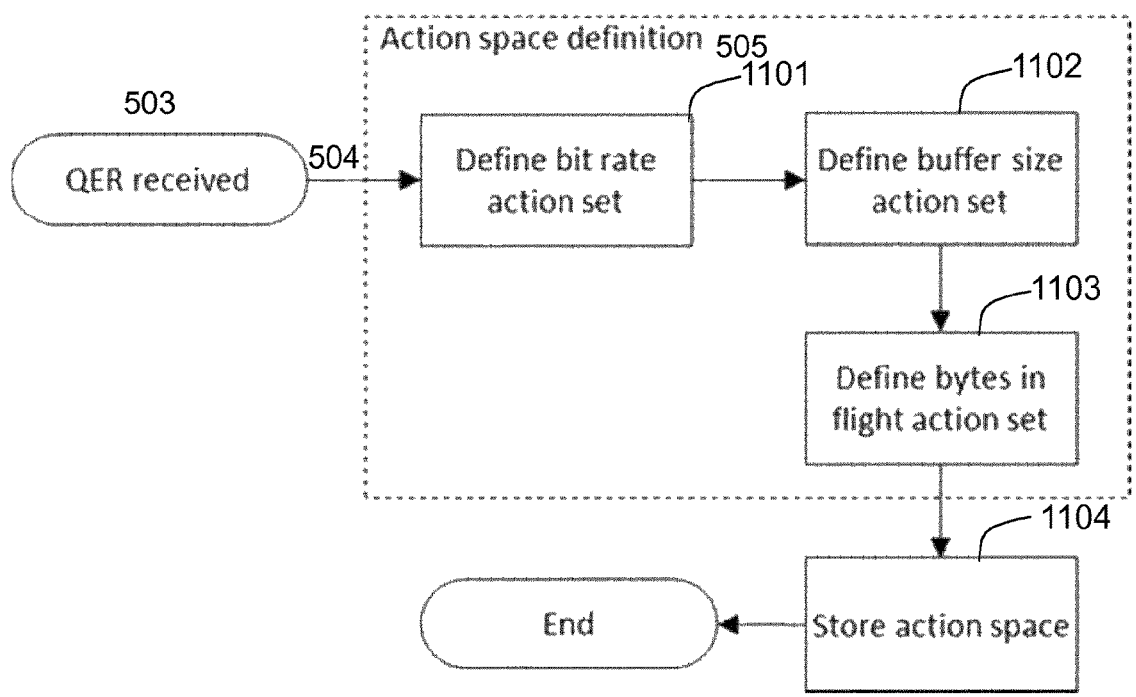
FIG. 11 is a flowchart depicting a non-limiting example of a method in a first node, according to embodiments herein.

FIG. 11 is a schematic diagram depicting a non-limiting example of a process that the first node 111, e.g., via the RL agent, may follow to configure the action space when it receives the fifth indication with the QER upon the PDU session establishment. The illustrated actions are described below. At 1101, the first node 111, e.g., via the RL agent, as part of the determination of the one or more components of Action 505, may define the first subset of actions of a bit rate, denoted in the Figure as the bit rate action set. The first node 111, e.g., via the RL agent, may define the first subset of actions of a bit rate based on: the MBR, the maximum, average, and/or minimum transmission bit rate increase, and/or the maximum, average, and/or minimum transmission bit rate decrease. The specific algorithm may be implementation specific, but for example, the RL agent may derive a discrete uniformly distributed bit rate action space with MBR as the maximum bit rate of the space, and with the average transmission rate increase and/or decrease as the step between the bit rates within the space. At 1102, the first node 111, e.g., via the RL agent, as part of the determination of the one or more components of Action 505, may define the second subset of actions of a buffer size, denoted in the Figure as the buffer size action set. The RL agent may define the second subset of actions of a buffer size based on: the current buffer sizes of the transparent buffer and TCP sender, the maximum buffered volume, the maximum, average, and/or minimum buffer size increase, and/or the maximum, average, and/or minimum buffer size decrease. The specific algorithm may be implementation specific but, for example, the RL agent may derive a discrete uniformly distributed buffer size action space with the maximum buffered volume as the maximum buffer size of the space, and with the average buffer size increase and/or decrease as the step between the buffer sizes within the space. At 1103, the first node 111, e.g., via the RL agent, as part of the determination of the one or more components of Action 505, may define the third subset of actions of bytes in flight, denoted in the Figure as the bytes in flight action set. The RL agent may define the third subset of actions of bytes in flight based on any of the above information but considering that the bytes in flight may be required to not exceed the maximum buffer size of the TCP sender. The specific algorithm may be implementation specific. At 1104, the first node 111, e.g., via the RL agent, may store the action space in a memory.

Figure 12:
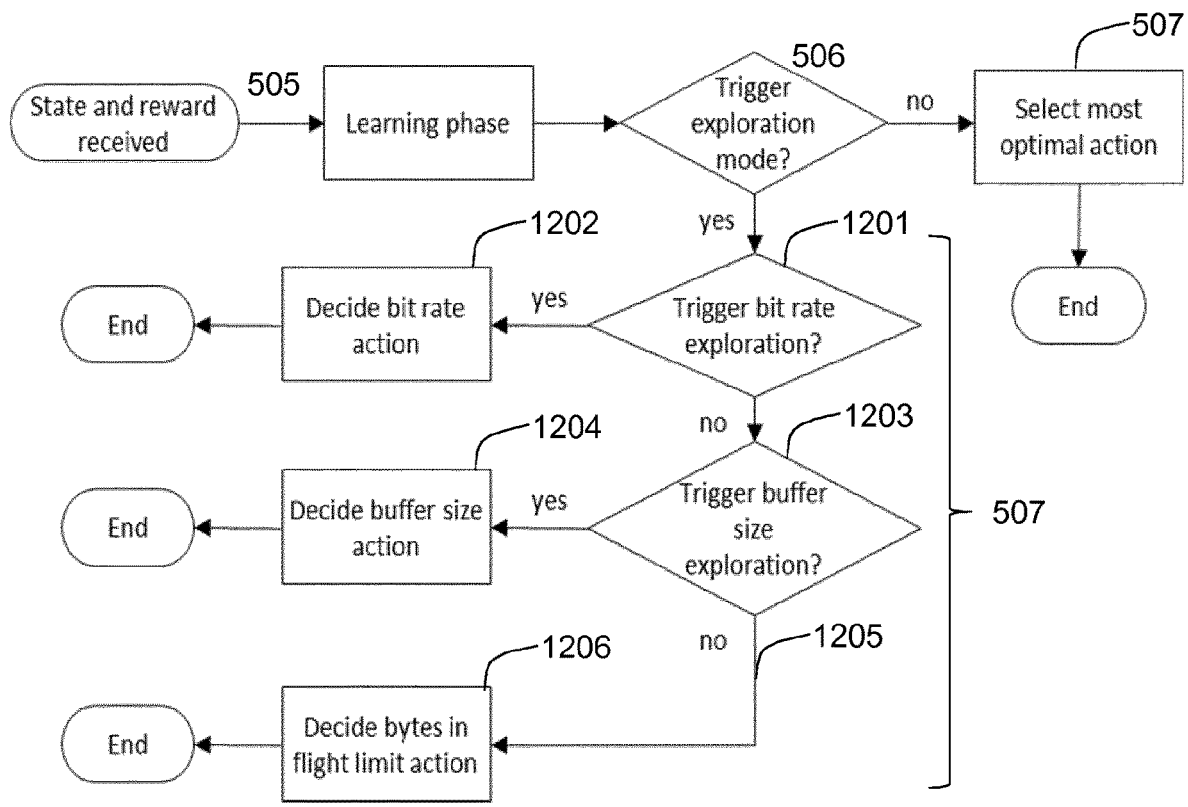
FIG. 12 is a flowchart depicting a non-limiting example of a method in a first node, according to embodiments herein.

FIG. 12 is a schematic diagram depicting a non-limiting example of a process that the first node 111, e.g., via the RL agent, may follow to decide the actions when it receives a state update and reward from the transparent buffer. According to examples of embodiments herein, the first node 111, e.g., via the RL agent, may explore only one dimension of the action space at a time when the RL agent enters in exploration mode, determined according to Action 506. These steps are described below. When, at 1201, the first node 111, e.g., via the RL agent, may decide to explore the first subset of actions of a bit rate, it may decide, at 1202, what bit rate action to take from the action space based on: a last bit rate action decided, the maximum, average, and/or minimum transmission bit rate increase, the maximum, average, and/or minimum transmission bit rate decrease, and/or the MBR. The specific algorithm may be implementation specific but, for example, the first node 111, e.g., via the RL agent may decide to explore the bit rate that corresponds to the current bit rate plus the maximum transmission bit rate increase, considering that it may be required to not exceed the MBR. When, at 1203, the first node 111, e.g., via the RL agent, may decide to explore the second subset of actions of a buffer size, it may decide, at 1202, what buffer size action to take from the action space based on: a last buffer size action decided, the maximum, average, and/or minimum buffer size increase, the maximum, average, and/or minimum buffer size decrease, the maximum buffered volume, and/or the transparent buffer size. The specific algorithm may be implementation specific but for example the first node 111, e.g., via the RL agent, may decide to explore the buffer size that corresponds to the current buffer size plus the maximum buffer size increase, considering that it may be required to not exceed the maximum buffered volume. When, at 1205, the first node 111, e.g., via the RL agent, may decide, at 1206, to explore the third subset of actions of bytes in flight, it may decide what bytes in flight limit action to take from the action space based on: a last bytes in flight limit action decided, the maximum buffered volume, and/or the transparent buffer size. The specific algorithm may be implementation specific. If, at 506 the first node 111, e.g., via the RL agent, decides not to trigger the exploration mode, it may select the most optimal action according to Action 507.

Figure 13:
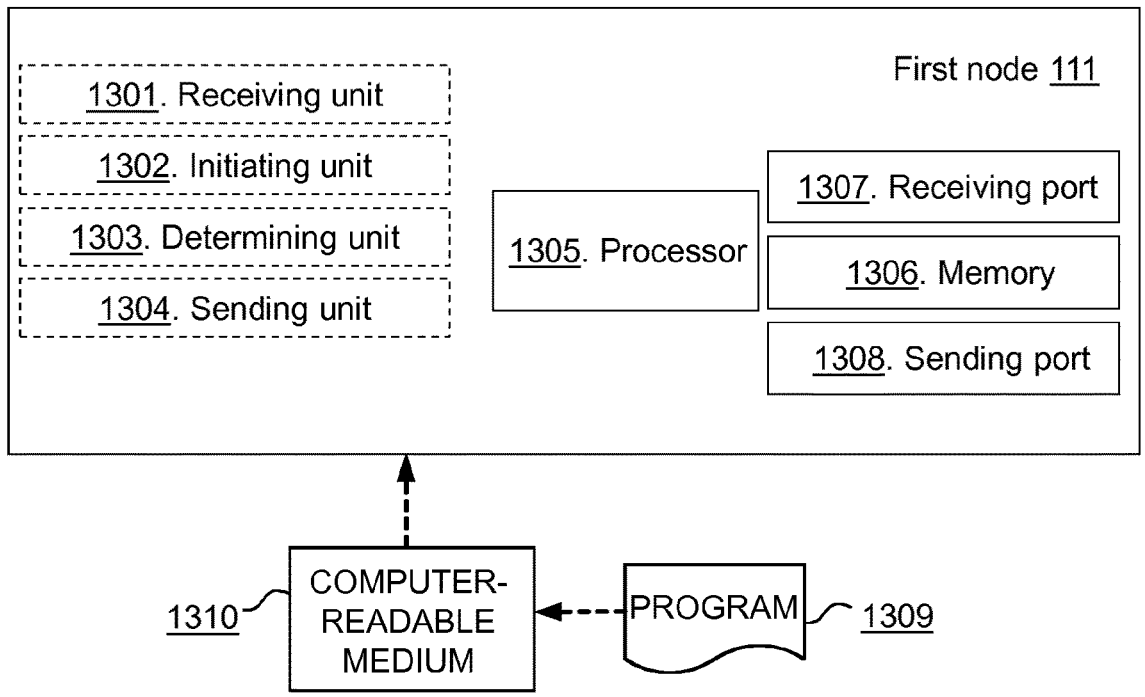
FIG. 13 is schematic block diagram illustrating two non-limiting examples, a) and b), of a first node, according to embodiments herein.
Figure 13:
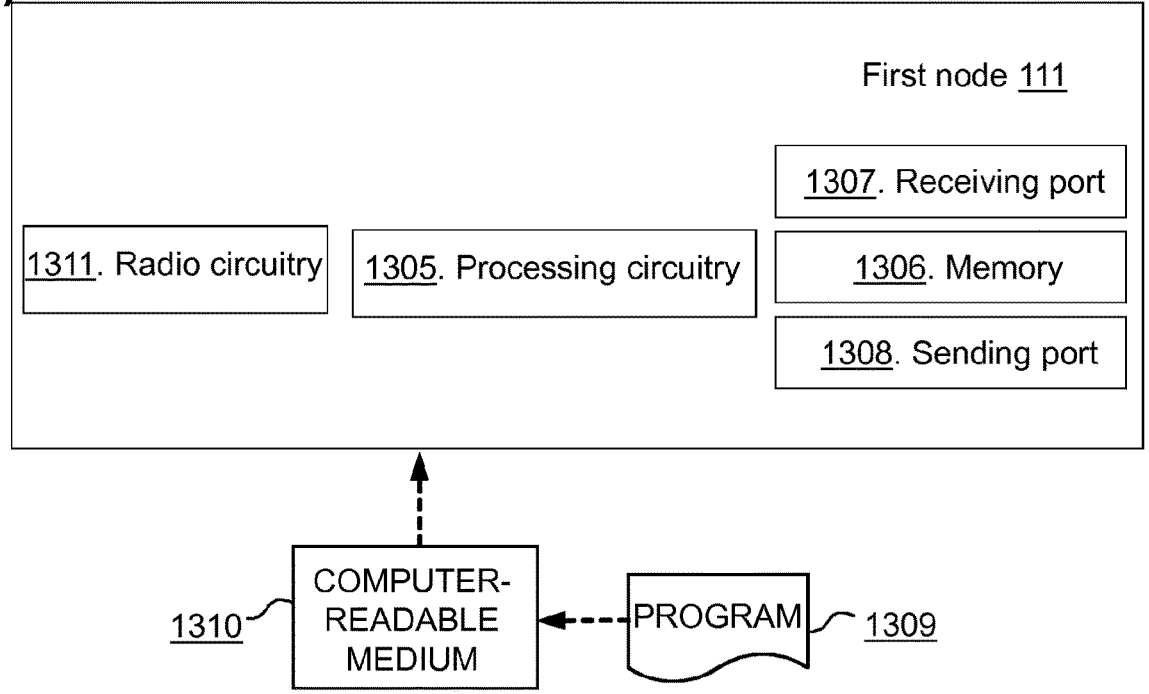

FIG. 13 depicts two different examples in panels a) and b), respectively, of the arrangement that the first node 111 may comprise to perform the method actions described above in relation to FIG. 5, FIG. 9, FIG. 11 and/or FIG. 10. The first node 111 for handling data traffic The first node 111 is configured to operate in the communications network 100.

The detailed description of some of the following corresponds to the same references provided above, in relation to the actions described for the first node 111, and will thus not be repeated here. For example, the first node 111 may be configured to manage a user plane function. In FIG. 13, optional units are indicated with dashed lines.

In some embodiments, the first node 111 may comprise the following arrangement depicted in FIG. 13a.

The first node 111 is configured to, e.g. by means of a receiving unit 1301 within the first node 111 configured to, receive the indication, that is, the fifth indication, from the second node 112 configured to operate in the communications network 100. The indication is configured to indicate, for a PFCP session, at least one of: i) the first rule for packet detection; and ii) the second rule of enforcement of quality of service.

The first node 111 is also configured to, e.g. by means of an initiating unit 1302 within the first node 111 configured to, initiate the process of optimization, based on reinforcement learning, of the procedure to control data traffic in the communications network 100. The process of optimization is further configured to be based on the indication configured to be received.

In some embodiments, the procedure to control data traffic in the communications network 100 may be configured to be the TCP.

In some embodiments, to initiate the process may be configured to comprise to, e.g. by means of a determining unit 1303 within the first node 111 configured to, determine the one or more components of the process of optimization, based on reinforcement learning, of the procedure to control data traffic in the communications network 100. The one or more components may be configured to be out of: i) the reward function, ii) the one or more states, and iii) the set of actions to use in the optimization, out of the plurality of actions to perform the optimization. To initiate the process may be further configured to comprise proceeding with the process based on the one or more components configured to be determined.

In some embodiments, to determine of the set of actions may be further configured to comprise to determine one or more of: i) the first subset of actions of the bit rate, ii) the second subset of actions of the buffer size, and iii) the third subset of actions of bytes in flight.

The second rule may be configured to comprise one or more of: the maximum bit rate, the ratio of ReTx, the maximum RTT deviation, the maximum ACKed bit rate, the maximum buffered volume, the maximum, average, and/or minimum transmission bit rate increase, the maximum, average, and/or minimum transmission bit rate decrease, the maximum, average, and/or minimum buffer size increase, and the maximum, average, and/or minimum buffer size decrease.

In some embodiments, at least one of the first rule and the second rule may be configured to be based on at least one of: i) the identity of the subscriber 131 of the communications network 100 the session may be configured to be established for, ii) the identity of the session, iii) the type of service the session may be configured to be established for; and iv) the policy rule for the group of subscribers 130 in the communications network 100.

In some embodiments, the process of optimization of the procedure to control data traffic may be configured to, e.g. by means of the determining unit 1303 within the first node 111 configured to, determine the learning mode out of the exploration mode and the exploitation mode. The process of optimization of the procedure to control data traffic may be further configured to, e.g. by means of the determining unit 1303 within the first node 111 configured to, determine, from the set of actions configured to be determined, the action configured to be performed. The determining of the action may be configured to be based on the learning mode configured to be determined.

The first node 111 may be also configured to, e.g. by means of a sending unit 1304 within the first node 111 configured to, send the first indication to the second node 112 configured to operate in the communications network 100. The first indication may be configured to indicate that the first node 111 is configured to support the process of optimization of the procedure to control data traffic based on reinforcement learning.

The first node 111 may be configured to, e.g. by means of the receiving unit 1301 within the first node 111 configured to, receive the second indication from the second node 112. The second indication may be configured to indicate that the second node 112 supports the process of optimization of the procedure to control data traffic based on reinforcement learning.

The indication configured to be received may be further configured to comprise the request to establish the PFCP session.

The embodiments herein may be implemented through one or more processors, such as a processor 1305 in the first node 111 depicted in FIG. 13a, together with computer program code for performing the functions and actions of the embodiments herein. The processor 1305 may be understood herein to be a hardware component. The program code mentioned above may also be provided as a computer program product, for instance in the form of a data carrier carrying computer program code for performing the embodiments herein when being loaded into the in the first node 111. It is however feasible with other data carriers such as a memory stick. The computer program code may furthermore be provided as pure program code on a server and downloaded to the first node 111.

The first node 111 may further comprise a memory 1306 comprising one or more memory units. The memory 1306 is arranged to be used to store obtained information, store data, configurations, schedulings, and applications etc. to perform the methods herein when being executed in the first node 111.

In some embodiments, the first node 111 may receive information from, e.g., the second node 112 and/or the third node 113, through a receiving port 1307. In some examples, the receiving port 1307 may be, for example, connected to one or more antennas in first node 111. In other embodiments, the first node 111 may receive information from another structure in the communications network 100 through the receiving port 1307. Since the receiving port 1307 may be in communication with the processor 1305, the receiving port 1307 may then send the received information to the processor 1305. The receiving port 1307 may also be configured to receive other information.

The processor 1305 in the first node 111 may be further configured to transmit or send information to e.g., the second node 112 and/or the third node 113, through a sending port 1308, which may be in communication with the processor 1305, and the memory 1306.

Any of the receiving unit 1301, the initiating unit 1302, the determining unit 1303, and the sending unit 1304 may be the processor 1305 of the first node 111, or an application running on such processor.

Those skilled in the art will also appreciate that any of the receiving unit 1301, the initiating unit 1302, the determining unit 1303, and the sending unit 1304 described above may refer to a combination of analog and digital circuits, and/or one or more processors configured with software and/or firmware, e.g., stored in memory, that, when executed by the one or more processors such as the processor 1305, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the first node 111 may be respectively implemented by means of a computer program 1309 product, comprising instructions, i.e., software code portions, which, when executed on at least one processor 1305, cause the at least one processor 1305 to carry out the actions described herein, as performed by the first node 111. The computer program 1309 product may be stored on a computer-readable storage medium 1310. The computer-readable storage medium 1310, having stored thereon the computer program 1309, may comprise instructions which, when executed on at least one processor 1305, cause the at least one processor 1305 to carry out the actions described herein, as performed by the first node 111. In some embodiments, the computer-readable storage medium 1310 may be a non-transitory computer-readable storage medium, such as memory stick, or stored in the cloud space. In other embodiments, the computer program 1309 product may be stored on a carrier containing the computer program, wherein the carrier is one of an electronic signal, optical signal, radio signal, or the computer-readable storage medium 1310, as described above.

The first node 111 may comprise an interface unit to facilitate communications between the first node 111 and other nodes or devices, e.g., the second node 112, and/or the third node 113. In some particular examples, the interface may, for example, include a transceiver configured to transmit and receive radio signals over an air interface in accordance with a suitable standard.

In other embodiments, the first node 111 may comprise the following arrangement depicted in FIG. 13b. The first node 111 may comprise a processing circuitry 1305, e.g., one or more processors such as the processor 1305, in the first node 111 and the memory 1306. The first node 111 may also comprise a radio circuitry 1311, which may comprise e.g., the receiving port 1307 and the sending port 1308. The processing circuitry 1305 may be configured to, or operable to, perform the method actions according to FIG. 5, FIG. 9, FIG. 11 and/or FIG. 10, in a similar manner as that described in relation to FIG. 13a. The radio circuitry 1311 may be configured to set up and maintain at least a wireless connection with, e.g., the second node 112, and/or the third node 113. Circuitry may be understood herein as a hardware component.

Hence, embodiments herein also relate to the first node 111 operative to operate in the communications network 100. The first node 111 may comprise the processing circuitry 1305 and the memory 1306, said memory 1306 containing instructions executable by said processing circuitry 1305, whereby the first node 111 is further operative to perform the actions described herein in relation to the first node 111, e.g., in FIG. 5, FIG. 9, FIG. 11 and/or FIG. 10.

Figure 14:
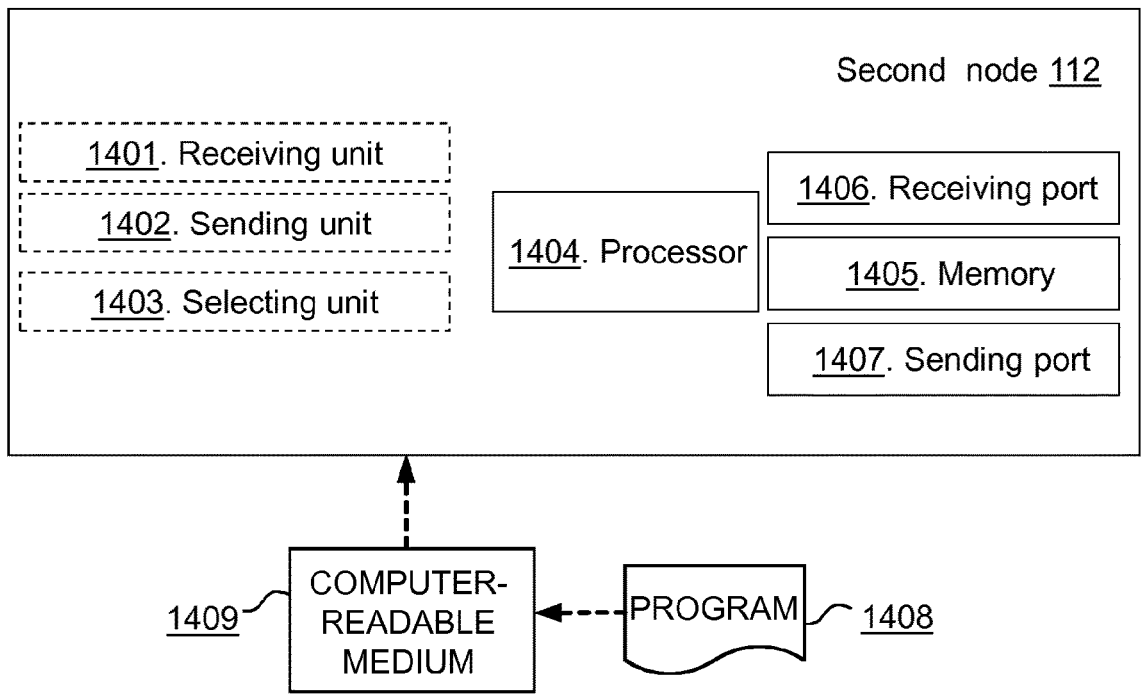
FIG. 14 is schematic block diagram illustrating two non-limiting examples, a) and b), of a second node, according to embodiments herein.
Figure 14:
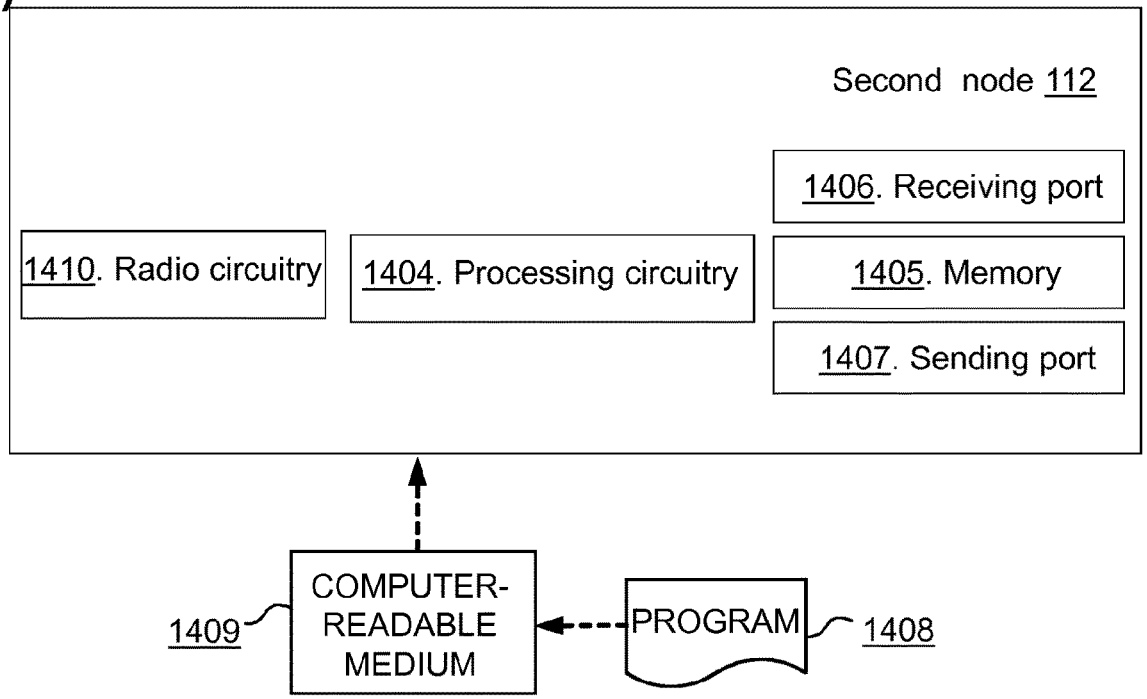

FIG. 14 depicts two different examples in panels a) and b), respectively, of the arrangement that the second node 112 may comprise to perform the method actions described above in relation to FIG. 6, FIG. 9, and/or FIG. 10. The second node 112 is for handling data traffic. The second node 112 is configured to operate in the communications network 100.

The detailed description of some of the following corresponds to the same references provided above, in relation to the actions described for the first node 111, and will thus not be repeated here. For example, the procedure to control data traffic in the communications network 100 may be configured to be the TCP. In FIG. 14, optional units are indicated with dashed lines.

In some embodiments, the second node 112 may comprise the following arrangement depicted in FIG. 14a.

The second node 112 is configured to, e.g. by means of a receiving unit 1401 within the second node 112 configured to, receive the first indication from the first node 111 configured to operate in the communications network 10. The first indication may be configured to indicate that the first node 111 is configured to support the process of optimization of the procedure to control data traffic based on reinforcement learning.

The second node 112 is also configured to, e.g. by means of a sending unit 1402 within the second node 112 configured to, send the indication to the first node 111. The indication may be configured to request the establishment of the PFCP session. The indication may be further configured to comprise at least one of: i) the first rule for packet detection; and ii) the second rule of enforcement of quality of service. To send the indication may be configured to be based on the first indication configured to be received.

The second node 112 may be also configured to, e.g. by means of the sending unit 1402 within the second node 112 configured to, send, in response to the first indication configured to be received, the second indication to the first node 111. The second indication may be configured to indicate that the second node 112 supports the process of optimization of the procedure to control data traffic based on reinforcement learning.

In some embodiments, the second rule may be configured to comprise one or more of: the maximum bit rate, the ratio of ReTx, the maximum RTT deviation, the maximum ACKed bit rate, the maximum buffered volume, the maximum, average, and/or minimum transmission bit rate increase, the maximum, average, and/or minimum transmission bit rate decrease, the maximum, average, and/or minimum buffer size increase, and the maximum, average, and/or minimum buffer size decrease.

In some embodiments, at least one of the first rule and the second rule may be configured to be based on at least one of: i) the identity of a subscriber 131 of the communications network 100 the session may be configured to be established for, ii) the identity of the session, iii) the type of service the session may be configured to be established for; and iv) the policy rule for the group of subscribers 130 in the communications network 100.

In some embodiments, the indication may be configured to be the fifth indication, and the second node 112 may be further configured to, e.g. by means of the sending unit 1403 within the first node 111 configured to, send the third indication to the third node 113 configured to operate in the communications network 100. The third indication may be configured to indicate the identity of the subscriber 131 of the communications network 100 the session may be configured to be established for. The second node 112 may be further configured to, e.g. by means of the receiving unit 1401 within the first node 111 configured to, receive, from the third node 113, the fourth indication. The fourth indication may be configured to indicate the set of policy rules to be used during the session, in the process of optimization of the procedure to control data traffic for the subscriber 131 in the communications network 100 based on reinforcement learning.

In some embodiments, the fourth indication may be configured to comprise one or more of: the identifier of the application, the maximum bit rate, the ratio of ReTx, the maximum RTT deviation, the maximum ACKed bit rate, the maximum buffered volume, the maximum, average, and/or minimum transmission bit rate increase, the maximum, average, and/or minimum transmission bit rate decrease, the maximum, average, and/or minimum buffer size increase, and the maximum, average, and/or minimum buffer size decrease.

In some embodiments, the indication may be configured to be the fifth indication, and the second node 112 may be further configured to, e.g. by means of a selecting unit 1403 within the first node 111 configured to, select, out of the plurality of first nodes 114, the first node 111 to establish the session with. To select may be configured to be based on the fourth indication configured to be received. The fifth indication may be configured to be sent to the first node 111 configured to be selected.

In some embodiments, the first node 111 may be configured to manage the user plane function, and the second node 112 may be configured to manage a session management function.

The embodiments herein may be implemented through one or more processors, such as a processor 1404 in the second node 112 depicted in FIG. 14a, together with computer program code for performing the functions and actions of the embodiments herein. The processor 1404 may be understood herein to be a hardware component. The program code mentioned above may also be provided as a computer program product, for instance in the form of a data carrier carrying computer program code for performing the embodiments herein when being loaded into the in the second node 112. It is however feasible with other data carriers such as a memory stick. The computer program code may furthermore be provided as pure program code on a server and downloaded to the second node 112.

The second node 112 may further comprise a memory 1405 comprising one or more memory units. The memory 1405 is arranged to be used to store obtained information, store data, configurations, schedulings, and applications etc. to perform the methods herein when being executed in the second node 112.

In some embodiments, the second node 112 may receive information from, e.g., the first node 111 and/or the third node 113, through a receiving port 1406. In some examples, the receiving port 1406 may be, for example, connected to one or more antennas in second node 112. In other embodiments, the second node 112 may receive information from another structure in the communications network 100 through the receiving port 1406. Since the receiving port 1406 may be in communication with the processor 1404, the receiving port 1406 may then send the received information to the processor 1404. The receiving port 1406 may also be configured to receive other information.

The processor 1404 in the second node 112 may be further configured to transmit or send information to e.g., the first node 111 and/or the third node 113, through a sending port 1407, which may be in communication with the processor 1404, and the memory 1405.

Any of the receiving unit 1401, the sending unit 1402 and the selecting unit 1403 may be the processor 1404 of the second node 112, or an application running on such processor.

Those skilled in the art will also appreciate that any of the sending unit 1402 and the selecting unit 1403 described above may refer to a combination of analog and digital circuits, and/or one or more processors configured with software and/or firmware, e.g., stored in memory, that, when executed by the one or more processors such as the processor 1404, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the second node 112 may be respectively implemented by means of a computer program 1408 product, comprising instructions, i.e., software code portions, which, when executed on at least one processor 1404, cause the at least one processor 1404 to carry out the actions described herein, as performed by the second node 112. The computer program 1408 product may be stored on a computer-readable storage medium 1409. The computer-readable storage medium 1409, having stored thereon the computer program 1408, may comprise instructions which, when executed on at least one processor 1404, cause the at least one processor 1404 to carry out the actions described herein, as performed by the second node 112. In some embodiments, the computer-readable storage medium 1409 may be a non-transitory computer-readable storage medium, such as memory stick, or stored in the cloud space. In other embodiments, the computer program 1408 product may be stored on a carrier containing the computer program, wherein the carrier is one of an electronic signal, optical signal, radio signal, or the computer-readable storage medium 1409, as described above.

The second node 112 may comprise an interface unit to facilitate communications between the second node 112 and other nodes or devices, e.g., the first node 111, and/or the third node 113. In some particular examples, the interface may, for example, include a transceiver configured to transmit and receive radio signals over an air interface in accordance with a suitable standard.

In other embodiments, the second node 112 may comprise the following arrangement depicted in FIG. 14b. The second node 112 may comprise a processing circuitry 1404, e.g., one or more processors such as the processor 1404, in the second node 112 and the memory 1405. The second node 112 may also comprise a radio circuitry 1410, which may comprise e.g., the receiving port 1406 and the sending port 1407. The processing circuitry 1404 may be configured to, or operable to, perform the method actions according to FIG. 6, FIG. 9, and/or FIG. 10, in a similar manner as that described in relation to FIG. 14a. The radio circuitry 1410 may be configured to set up and maintain at least a wireless connection with, e.g., the first node 111, and/or the third node 113. Circuitry may be understood herein as a hardware component.

Hence, embodiments herein also relate to the second node 112 operative to operate in the communications network 100. The second node 112 may comprise the processing circuitry 1404 and the memory 1405, said memory 1405 containing instructions executable by said processing circuitry 1404, whereby the second node 112 is further operative to perform the actions described herein in relation to the second node 112, e.g., in FIG. 6, FIG. 9, and/or FIG. 10.

Figure 15:
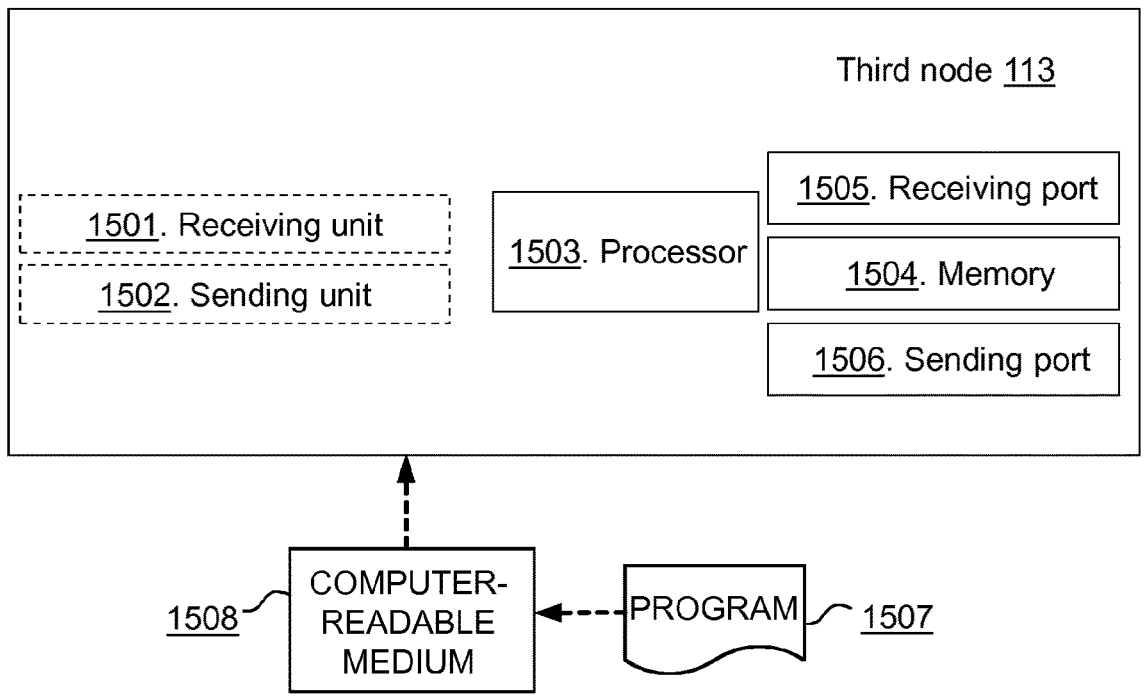
FIG. 15 is a schematic block diagram illustrating two non-limiting examples, a) and b), of a third node, according to embodiments herein.
Figure 15:
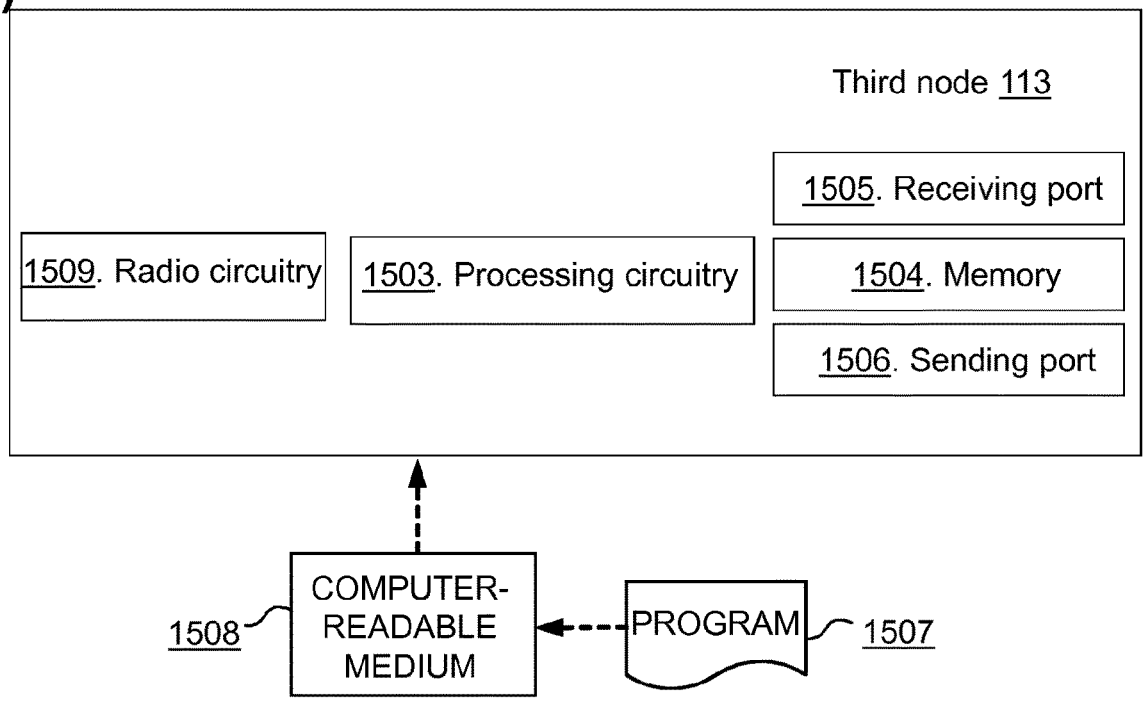

FIG. 15 depicts two different examples in panels a) and b), respectively, of the arrangement that the third node 113 may comprise to perform the method actions described above in relation to FIG. 7, and/or FIG. 10. The third node 113 is for handling data traffic. The third node 113 is configured to operate in the communications network 100.

The detailed description of some of the following corresponds to the same references provided above, in relation to the actions described for the first node 111, and will thus not be repeated here. For example, the procedure to control data traffic in the communications network 100 may be configured to be the TCP. In FIG. 15, optional units are indicated with dashed lines.

In some embodiments, the third node 113 may comprise the following arrangement depicted in FIG. 15a.

The third node 113 is configured to, e.g. by means of a receiving unit 150 within the third node 113 configured to, receive the third indication from the second node 112 configured to operate in the communications network 100. The third indication may be configured to indicate the identity of the subscriber 131 of the communications network 100 the PFCP session is configured to be established for.

The third node 113 is configured to, e.g. by means of a sending unit 1502 within the third node 113 configured to, send, based on the identity of the subscriber 131, the fourth indication to the second node 112. The fourth indication may be configured to indicate the set of policy rules to be used during the session, in the process of optimization of the procedure to control data traffic for the subscriber 131 in the communications network 100 based on reinforcement learning.

In some embodiments, the fourth indication may be configured to comprise one or more of: the identifier of the application, the maximum bit rate, the ratio of ReTx, the maximum RTT deviation, the maximum ACKed bit rate, the maximum buffered volume, the maximum, average, and/or minimum transmission bit rate increase, the maximum, average, and/or minimum transmission bit rate decrease, the maximum, average, and/or minimum buffer size increase, and the maximum, average, and/or minimum buffer size decrease.

In some embodiments, the fourth indication may be configured to be further based on at least one of: i) the identity of the session, ii) the type of service the session is configured to be established for; and iii) the policy rule for the group of subscribers 130 in the communications network 100.

In some embodiments, the third node 113 may be configured to manage the policy control function and the second node 112 may be configured to manage the session management function.

The embodiments herein may be implemented through one or more processors, such as a processor 1503 in the third node 113 depicted in FIG. 15a, together with computer program code for performing the functions and actions of the embodiments herein. The processor 1503 may be understood herein to be a hardware component. The program code mentioned above may also be provided as a computer program product, for instance in the form of a data carrier carrying computer program code for performing the embodiments herein when being loaded into the in the third node 113. It is however feasible with other data carriers such as a memory stick. The computer program code may furthermore be provided as pure program code on a server and downloaded to the third node 113.

The third node 113 may further comprise a memory 1504 comprising one or more memory units. The memory 1504 is arranged to be used to store obtained information, store data, configurations, schedulings, and applications etc. to perform the methods herein when being executed in the third node 113.

In some embodiments, the third node 113 may receive information from, e.g., the first node 111 and/or the second node 112, through a receiving port 1505. In some examples, the receiving port 150 may be, for example, connected to one or more antennas in the third node 113. In other embodiments, the third node 113 may receive information from another structure in the communications network 100 through the receiving port 1505. Since the receiving port 1505 may be in communication with the processor 1503, the receiving port 1505 may then send the received information to the processor 1503. The receiving port 1505 may also be configured to receive other information.

The processor 1503 in the third node 113 may be further configured to transmit or send information to e.g., the first node 111 and/or the second node 112, through a sending port 1506, which may be in communication with the processor 1503, and the memory 1504.

Any of the receiving unit 1501 and the sending unit 1502 may be the processor 1503 of the third node 113, or an application running on such processor.

Those skilled in the art will also appreciate that the receiving unit 1501 and the sending unit 1502 described above may refer to a combination of analog and digital circuits, and/or one or more processors configured with software and/or firmware, e.g., stored in memory, that, when executed by the one or more processors such as the processor 1503, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the third node 113 may be respectively implemented by means of a computer program 1507 product, comprising instructions, i.e., software code portions, which, when executed on at least one processor 1503, cause the at least one processor 1503 to carry out the actions described herein, as performed by the third node 113. The computer program 1507 product may be stored on a computer-readable storage medium 1508. The computer-readable storage medium 1508, having stored thereon the computer program 1507, may comprise instructions which, when executed on at least one processor 1503, cause the at least one processor 1503 to carry out the actions described herein, as performed by the third node 113. In some embodiments, the computer-readable storage medium 1508 may be a non-transitory computer-readable storage medium, such as memory stick, or stored in the cloud space. In other embodiments, the computer program 1507 product may be stored on a carrier containing the computer program, wherein the carrier is one of an electronic signal, optical signal, radio signal, or the computer-readable storage medium 1508, as described above.

The third node 113 may comprise an interface unit to facilitate communications between the third node 113 and other nodes or devices, e.g., the first node 111, and/or the second node 112. In some particular examples, the interface may, for example, include a transceiver configured to transmit and receive radio signals over an air interface in accordance with a suitable standard.

In other embodiments, the third node 113 may comprise the following arrangement depicted in FIG. 15b. The third node 113 may comprise a processing circuitry 1503, e.g., one or more processors such as the processor 1503, in the third node 113 and the memory 1504. The third node 113 may also comprise a radio circuitry 1509, which may comprise e.g., the receiving port 1505 and the sending port 1506. The processing circuitry 1503 may be configured to, or operable to, perform the method actions according to FIG. 7, and/or FIG. 10, in a similar manner as that described in relation to FIG. 15a. The radio circuitry 1509 may be configured to set up and maintain at least a wireless connection with, e.g., the first node 111, and/or the second node 112. Circuitry may be understood herein as a hardware component.

Hence, embodiments herein also relate to the third node 113 operative to operate in the communications network 100. The third node 113 may comprise the processing circuitry 1503 and the memory 1504, said memory 1504 containing instructions executable by said processing circuitry 1503, whereby the third node 113 is further operative to perform the actions described herein in relation to the third node 113, e.g., in FIG. 7, and/or FIG. 10.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

REFERENCES

[1].—3GPP TS 23.501 v15.2.0 "System Architecture for 5G System"
[2].—3GPP TS 23.501 v15.2.0 "Procedures for 5G System"

The invention claimed is:

1. A first node for handling data traffic, the first node being configured to operate in a communications network, the first node being further configured to:
   receive an indication from a second node configured to operate in the communications network, the indication being configured to indicate, for a packet forwarding control protocol, PFCP, session, at least one of:
   i. a first rule for packet detection; and
   ii. a second rule of enforcement of quality of service;
   initiate a process of optimization, based on reinforcement learning, of a procedure to control data traffic in the communications network, the process of optimization being further configured to be based on the indication configured to be received;
   send a first indication to a second node configured to operate in the communications network, the first indication being configured to indicate that the first node is configured to support the process of optimization of the procedure to control data traffic based on reinforcement learning; and
   receive a second indication from the second node, the second indication being configured to indicate that the second node supports the process of optimization of the procedure to control data traffic based on reinforcement learning.

2. The first node according to claim 1, wherein initiating the process of optimization includes the first node being configured to:
   determine one or more components of the process of optimization, based on reinforcement learning, of the procedure to control data traffic in the communications network, the one or more components being configured to be out of:
   i. a reward function;
   ii. one or more states; and
   iii. a set of actions to use in the optimization, out of a plurality of actions to perform the optimization,
   and wherein initiating the process of optimization includes the first node being further configured to proceed with the process based on the one or more components configured to be determined.

3. The first node according to claim 2, wherein determining the set of actions includes determining one or more of:
   i. a first subset of actions of a bit rate;
   ii. a second subset of actions of a buffer size; and
   iii. a third subset of actions of bytes in flight.

4. The first node according to claim 1, wherein the second rule is configured to comprise one or more of: a maximum bit rate, a ratio of reception and transmission, ReTx, a maximum round trip time, RTT, deviation, a maximum acknowledged, ACKed, bit rate, a maximum buffered volume, at least one of a maximum, average, and minimum transmission bit rate increase, at least one of a maximum, average, and minimum transmission bit rate decrease, at least one of a maximum, average, and minimum buffer size increase, and, at least one of a maximum, average, and minimum buffer size decrease.

5. The first node according to claim 1, wherein at least one of the first rule and the second rule is configured to be based on at least one of:
   i. an identity of a subscriber of the communications network the session is configured to be established for:
   ii. an identity of the session;
   iii. a type of service the session is configured to be established for; and
   iv. a policy rule for a group of subscribers in the communications network.

6. The first node according to claim 1, wherein the process of optimization of the procedure to control data traffic is configured to:
   determine a learning mode out of an exploration mode and an exploitation mode; and
   determine, from the set of actions configured to be determined, an action configured to be performed, the determining of the action being configured to be based on the learning mode configured to be determined.

7. The first node according to claim 1, wherein the indication configured to be received is further configured to comprise a request to establish the PFCP session.

8. The first node according to claim 1, wherein the first node is configured to manage a user plane function.

9. A second node for handling data traffic, the second node being configured to operate in a communications network, the second node being further configured to:
   receive a first indication from a first node configured to operate in the communications network, the first indication being configured to indicate that the first node is configured to support a process of optimization of a procedure to control data traffic based on reinforcement learning;
   send an indication to the first node, the indication being configured to request an establishment of a packet forwarding control protocol, PFCP, session, the indication being further configured to comprise at least one of:
   i. a first rule for packet detection; and
   ii. a second rule of enforcement of quality of service;
   sending the indication being configured to be based on the first indication configured to be received; and
   send, in response to the first indication configured to be received, a second indication to the first node, the second indication being configured to indicate that the second node supports the process of optimization of the procedure to control data traffic based on reinforcement learning.

10. The second node according to claim 9, wherein the second rule is configured to comprise one or more of: a maximum bit rate, a ratio of reception and transmission, ReTx, a maximum round trip time, RTT, deviation, a maximum acknowledged, ACKed, bit rate, a maximum buffered volume, at least one of a maximum, average, and minimum transmission bit rate increase, at least one of a maximum, average, and minimum transmission bit rate decrease, a maximum, average, and/or minimum buffer size increase, and a maximum, average, and/or minimum buffer size decrease.

11. The second node according to claim 9, wherein at least one of the first rule and the second rule is configured to be based on at least one of:
   i. an identity of a subscriber of the communications network the session is configured to be established for;
   ii. an identity of the session;
   iii. a type of service the session is configured to be established for; and iv. a policy rule for a group of subscribers in the communications network.

12. The second node according to claim 11, wherein the indication is configured to be a fifth indication, and wherein the second node is further configured to:
   send a third indication to a third node configured to operate in the communications network, the third indication being configured to indicate an identity of the subscriber of the communications network the session is configured to be established for; and
   receive, from the third node, a fourth indication, the fourth indication being configured to indicate a set of policy rules to be used during the session, in the process of optimization of the procedure to control data traffic for the subscriber in the communications network based on reinforcement learning.

13. The second node according to claim 12, wherein the fourth indication is configured to comprise one or more of: an identifier of an application, a maximum bit rate, a ratio of reception and transmission, ReTx, a maximum round trip time, RTT, deviation, a maximum acknowledged, ACKed, bit rate, a maximum buffered volume, at least one of a maximum, average, and minimum transmission bit rate increase, a maximum, average, and minimum transmission bit rate decrease, at least one of a maximum, average, and minimum buffer size increase, and at least one of a maximum, average, and minimum buffer size decrease.

14. The second node according to claim 12, wherein the indication is configured to be a fifth indication, and wherein the second node is further configured to:
   select, out of a plurality of first nodes, the first node to establish the session with, wherein to select is configured to be based on the fourth indication configured to be received, and wherein the fifth indication is configured to be sent to the first node configured to be selected.

15. The second node according to claim 9, wherein the first node is configured to manage a user plane function and the second node is configured to manage a session management function.

* * * * *